(12) United States Patent
Sakamoto

(10) Patent No.: US 8,102,595 B2
(45) Date of Patent: Jan. 24, 2012

(54) OPTICAL TRANSMISSION SYSTEM WITH OPTICAL AMPLIFIER GAIN SETUP BASED ON DIFFERENCE BETWEEN SIGNAL LOSS AND NOISE LIGHT LOSS

(75) Inventor: Takeshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 12/461,255

(22) Filed: Aug. 5, 2009

(65) Prior Publication Data

US 2010/0079856 A1 Apr. 1, 2010

(30) Foreign Application Priority Data

Oct. 1, 2008 (JP) .................................. 2008-256000

(51) Int. Cl.
*H04B 10/12* (2006.01)
*H04B 10/17* (2006.01)

(52) U.S. Cl. .............. 359/341.41; 359/337.2; 359/337.5

(58) Field of Classification Search ............... 359/337.2, 359/337.5, 341.41
See application file for complete search history.

(56) References Cited

U.S. PATENT DOCUMENTS

| 6,456,428 | B1 | 9/2002 | Nakaji et al. | |
| 7,113,709 | B2 | 9/2006 | Kawasumi | |
| 2003/0133713 | A1* | 7/2003 | Ng et al. | 398/37 |
| 2003/0231886 | A1* | 12/2003 | Young et al. | 398/101 |

FOREIGN PATENT DOCUMENTS

| JP | 2001-144353 | 5/2001 |
| JP | 3833684 | 10/2006 |

OTHER PUBLICATIONS

Patent Abstracts of Japan Publication No. 2001-144353 Date of Publication: May 25, 2001.
Patent Abstract Publication No. JP3833684 Date of Publication: Oct. 18, 2006.

* cited by examiner

*Primary Examiner* — Eric Bolda
(74) *Attorney, Agent, or Firm* — Staas & Halsey LLP

(57) ABSTRACT

In an optical transmission system, a controller acquires a noise light loss value, which indicates a loss that noise light output from an upstream-side optical amplifier undergoes during propagation to a downstream-side optical amplifier through an optical loss medium, and a signal beam loss value, which indicates a loss that a signal beam output from the upstream-side optical amplifier undergoes during propagation to the downstream-side optical amplifier through the optical loss medium, obtains, as a loss difference, a difference between the noise light loss value and the signal beam loss value and, when setting up the downstream-side optical amplifier, determines the gain of the downstream-side optical amplifier by compensating the loss difference.

10 Claims, 23 Drawing Sheets

OPTICAL TRANSMISSION SYSTEM WITH OPTICAL AMPLIFIER GAIN SETUP BASED ON DIFFERENCE BETWEEN SIGNAL LOSS AND NOISE LIGHT LOSS

CROSS-REFERENCE TO RELATED APPLICATIONS

This application is based upon and claims the benefit of priority of the prior Japanese Patent Application No. 2008-256000, filed on Oct. 1, 2008, the entire contents of which are incorporated herein by reference.

FIELD

The embodiments discussed herein are related to optical transmission systems for transmitting light through optical fiber transmission lines.

BACKGROUND

In optical communication networks, optical amplifiers inserted in optical fiber transmission lines need to be set up in advance by setting their gain, which is an amplification factor determining the relationship of the output level with the input level.

The optical amplifier is set up by a method described below. When a system is introduced, for example, with no operational signal beam propagated, ASE (Amplified Spontaneous Emission) light with transmit power equivalent to that of a single-wavelength signal of the operational signal beam is emitted from the post-amplifier of a transmitting station, and the in-line amplifier of a downstream-side repeater station or the pre-amplifier of a downstream-side receiving station is set up by determining its gain with the use of the ASE light (in the following, the method using ASE light to set up an optical amplifier is referred to also as ASE setup).

In the case of an optical amplifier of which the principle of amplification is stimulated emission, such as an EDFA (Erbium-Doped Fiber Amplifier), the phenomenon of spontaneous emission takes place irrespective of the presence or absence of input light. Broadband noise light leaking from the optical amplifier due to this phenomenon is called ASE light.

FIG. 17 schematically illustrates the conventional ASE setup. An optical transmission system 5 comprises a transmitting station 51 and a receiving station 52 interconnected by an optical fiber transmission line f. The transmitting station 51 includes a post-amplifier 51a of which the output level of ASE light can be varied, and the receiving station 52 includes a DCF (Dispersion Compensating Fiber) 52a and a pre-amplifier 52b.

A signal beam amplified by and output from the post-amplifier 51a is transmitted through the optical fiber transmission line f. The DCF 52a compensates the chromatic dispersion of the incoming signal beam caused on the optical fiber transmission line f. The pre-amplifier 52b receives and amplifies the dispersion-compensated signal beam.

When the ASE setup of the pre-amplifier 52b is performed prior to the start of operation of the optical transmission system 5, ASE light with transmit power equivalent to that of a single-wavelength signal of the operational signal beam is emitted from the post-amplifier 51a.

The ASE light is propagated through the optical fiber transmission line f and reaches the receiving station 52, where the ASE light passes through the DCF 52a and then enters the pre-amplifier 52b. FIG. 17 also illustrates the power levels of the ASE light at respective points p1 to p3 (wherein the vertical axes indicate optical power and the horizontal axes indicate wavelength). The point p1 indicates the transmit power of the ASE light, and the point p2 indicates the receive power of the ASE light at the input end of the pre-amplifier 52b. The point p3 indicates the output power of the ASE light amplified by the pre-amplifier 52b.

At the receiving station 52, the gain of the pre-amplifier 52b is determined by using the received ASE light such that the output power of the pre-amplifier 52b is equal to a target output value for an actual signal beam (target output value for the single-wavelength signal).

FIG. 18 illustrates the signal beam power during operation of the system after the ASE setup. More specifically, FIG. 18 depicts the power levels of an actual signal beam observed at the respective points p1 to p3 after the ASE setup illustrated in FIG. 17. Using the gain determined during the ASE setup, the pre-amplifier 52b amplifies the actual signal beam up to the target output level.

Thus, the ASE setup enables the gain of an optical amplifier to be determined efficiently prior to the start of operation of the system. Also, in a redundant configuration wherein in the event of a line fault, for example, the active system is instantly switched to the standby system, the optical amplifier may be kept ready (in a standby state) with its gain set to that determined by the setup, whereby the switchover time can be minimized.

As conventional techniques, a technique has been proposed in which automatic gain control is performed by using the ASE noise light separated from amplified light (Japanese Laid-Open Patent Publication No. 2001-144353 (paragraph no. [0013], FIG. 1)). A technique has also been proposed in which variable optical attenuators and tunable dispersion compensators are set and controlled so that the optical loss and the chromatic dispersion may be equal among multiple optical transmission lines, to allow the receiving-side amplifier to receive and amplify an optical signal whose input optical level is kept fixed (Japanese Patent No. 3833684 (page 5, lines 3 to 24, FIG. 1)).

In cases where light with multiple wavelengths is transmitted over a long distance, the chromatic dispersion and output level that vary from wavelength to wavelength need to be compensated at the repeater or receiving station. To this end, dispersion compensators such as DCFs or other compensation devices such as gain equalizers are inserted in optical fiber transmission lines.

In many conventional systems, fixed compensation devices (such as DCFs) with fixed dispersion compensation values or fixed equalization characteristics are used. In the future, it is expected that variable compensation devices whose compensation values are variably adjustable, such as a TDC (Tunable Dispersion Compensator) and a DGE (Dynamic Gain Equalizer), will be used more and more with a view to simplifying the system configuration as far as possible and cutting down costs by reducing the number of types of compensation devices to be kept in stock.

FIG. 19 illustrates the configuration of a DGE as an example of such variable compensation devices. The DGE 6 comprises a DEMUX (wavelength demultiplexer) 61, VOAs (Variable Optical Attenuators) 62-1 to 62-n, and a MUX (wavelength multiplexer) 63.

The DEMUX 61 receives a WDM (Wavelength Division Multiplexing) signal having n wavelengths multiplexed, and demultiplexes the received WDM signal into respective wavelengths. The VOAs 62-1 to 62-n have their attenuation amounts variably set for the respective wavelengths. The MUX 63 multiplexes the wavelength signals whose levels have been varied, to generate a WDM signal, and outputs the generated signal.

A fixed compensation device has a loss characteristic (loss profile) nearly uniform throughout the wavelength band of the signal beam. FIG. 20 illustrates such a loss characteristic of a fixed compensation device, wherein the vertical axis indicates insertion loss (IL) (dB) and the horizontal axis indicates wavelength (nm).

As seen from the graph, the loss is nearly uniform with respect to every wavelength in the wavelength band of the signal beam, exhibiting a nearly flat loss characteristic (in practice, some ripples are contained, but in the schematic illustration of FIG. 20, flatness of the loss characteristic is indicated simply by a straight line).

In a system configuration wherein a fixed compensation device having such a loss characteristic is inserted in the optical fiber transmission line connecting between the post-amplifier and the pre-amplifier, no particular inconvenience is caused if the aforementioned ASE setup for the pre-amplifier is executed.

Many of variable compensation devices, on the other hand, have loss characteristics involving periodicity in the direction of wavelength. FIG. 21 illustrates such a loss characteristic of a variable compensation device, wherein the vertical axis indicates insertion loss (IL) (dB), and the horizontal axis indicates wavelength (nm).

The loss characteristic is not uniform within the wavelength band of the signal beam, as depicted in FIG. 21, and because of this, although the loss is small at each wavelength peak of the signal beam, the loss increases if the wavelength is shifted even slightly from the wavelength peak. For example, at wavelengths $\lambda 1$ and $\lambda 2$ of the signal beam, the loss is approximately 3 dB, but at a wavelength $\lambda a$ shifted from the wavelengths $\lambda 1$ and $\lambda 2$, the loss increases to 8 dB.

In a system configuration wherein a variable compensation device having such a loss characteristic is inserted in the optical fiber transmission line connecting between the post-amplifier and the pre-amplifier, when the aforementioned ASE light is emitted to set up the pre-amplifier, the power of the ASE light greatly lowers due to the loss characteristic of the variable compensation device. At the time of the ASE setup, therefore, the gain of the pre-amplifier is determined using the ASE light whose loss is larger than an actual loss of the signal beam caused during the transmission.

This means, however, that the gain is determined to provide a target output value by using power which is lower than the receive power of an actual single-wavelength signal beam. Consequently, a gain excessively large for the actual signal beam is set, giving rise to a problem that the optical amplifier fails to be set up with accuracy.

FIG. 22 schematically illustrates the ASE setup of a system having a variable compensation device incorporated therein. An optical transmission system 5-1 comprises a transmitting station 51 and a receiving station 52-1 interconnected by an optical fiber transmission line f. The transmitting station 51 includes a post-amplifier 51a, and the receiving station 52-1 includes a TDC (Tunable Dispersion Compensator) 52a-1 and a pre-amplifier 52b.

When performing the ASE setup for the pre-amplifier 52b in the optical transmission system 5-1, the post-amplifier 51a is caused to emit ASE light with transmit power corresponding to that of a single-wavelength signal of the operational signal beam. The ASE light is propagated through the optical fiber transmission line f and reaches the receiving station 52-1. After passing through the TDC 52a-1, the ASE light enters the pre-amplifier 52b.

FIG. 22 also illustrates the power levels of the ASE light at respective points p1 to p3 (the vertical axes indicate optical power and the horizontal axes indicate wavelength). Specifically, the point p1 indicates the transmit power of the ASE light, and the point p2 indicates the receive power of the ASE light at the input end of the pre-amplifier 52b. The point p3 indicates the output power of the ASE light amplified by the pre-amplifier 52b.

The TDC 52a-1 has a periodic loss characteristic as illustrated in FIG. 21. Thus, as the ASE light passes through the TDC 52a-1 having such a loss characteristic, the power of the ASE light lowers in such a manner that the optical power profile is trimmed off along the loss characteristic of the TDC 52a-1 (the wavelength regions other than the signal wavelengths within the band of the ASE light are trimmed off) (point p2).

At the receiving station 52-1, the gain of the pre-amplifier 52b is determined by using the ASE light passed through the TDC 52a-1 so that the output power of the pre-amplifier 52b may be equal to the target output value for an actual signal beam (target output value for a single-wavelength signal).

FIG. 23 illustrates the signal beam power observed during the operation of the system after the ASE setup, or more specifically, the power levels of an actual signal beam observed at the respective points p1 to p3 after the execution of the ASE setup illustrated in FIG. 22. Using the gain determined at the time of the ASE setup, the pre-amplifier 52b amplifies the actual signal beam.

However, the gain of the pre-amplifier 52b has been determined using the ASE light whose power was greatly reduced because of the passage through the TDC 52a-1 (ASE power after passage through TDC<signal beam power after passage through TDC), and this means that the gain has been determined to provide the target output value, on the basis of the level lower than the receive level of an actual single-wavelength signal beam. Accordingly, the set gain is too high for the actual signal beam, with the result that during the operation, a signal beam with excessively high power is output, as indicated by the point p3.

SUMMARY

According to one aspect of the present invention, an optical transmission system for transmitting light through an optical fiber transmission line includes an upstream station including a first optical amplifier, and a downstream station including a second optical amplifier and a controller configured to determine a gain of the second optical amplifier when setting up the second optical amplifier, wherein an optical loss medium having a loss characteristic not uniform in a direction of wavelength is arranged at a stage preceding the second optical amplifier, and the controller acquires a noise light loss value, which indicates a loss that noise light output from the first optical amplifier of the upstream station undergoes during propagation to the second optical amplifier through the optical loss medium, and a signal beam loss value, which indicates a loss that a signal beam output from the first optical amplifier undergoes during propagation to the second optical amplifier through the optical loss medium, obtains, as a loss difference, a difference between the noise light loss value and the signal beam loss value and, when setting up the second optical amplifier, determines the gain by compensating the loss difference.

The object and advantages of the invention will be realized and attained by means of the elements and combinations particularly pointed out in the claims.

BRIEF DESCRIPTION OF DRAWING(S)

Figure 17:
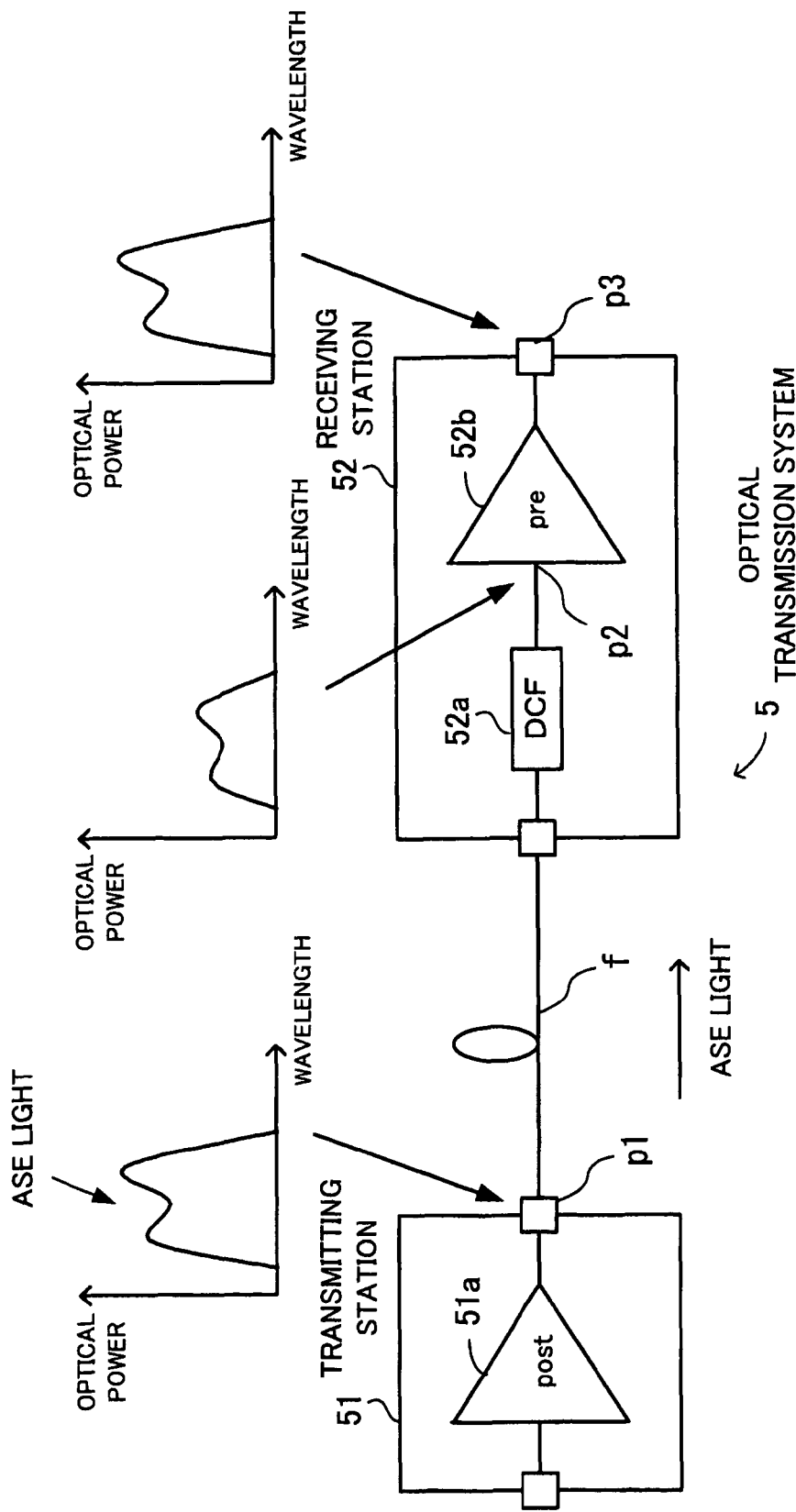
Figure 18:
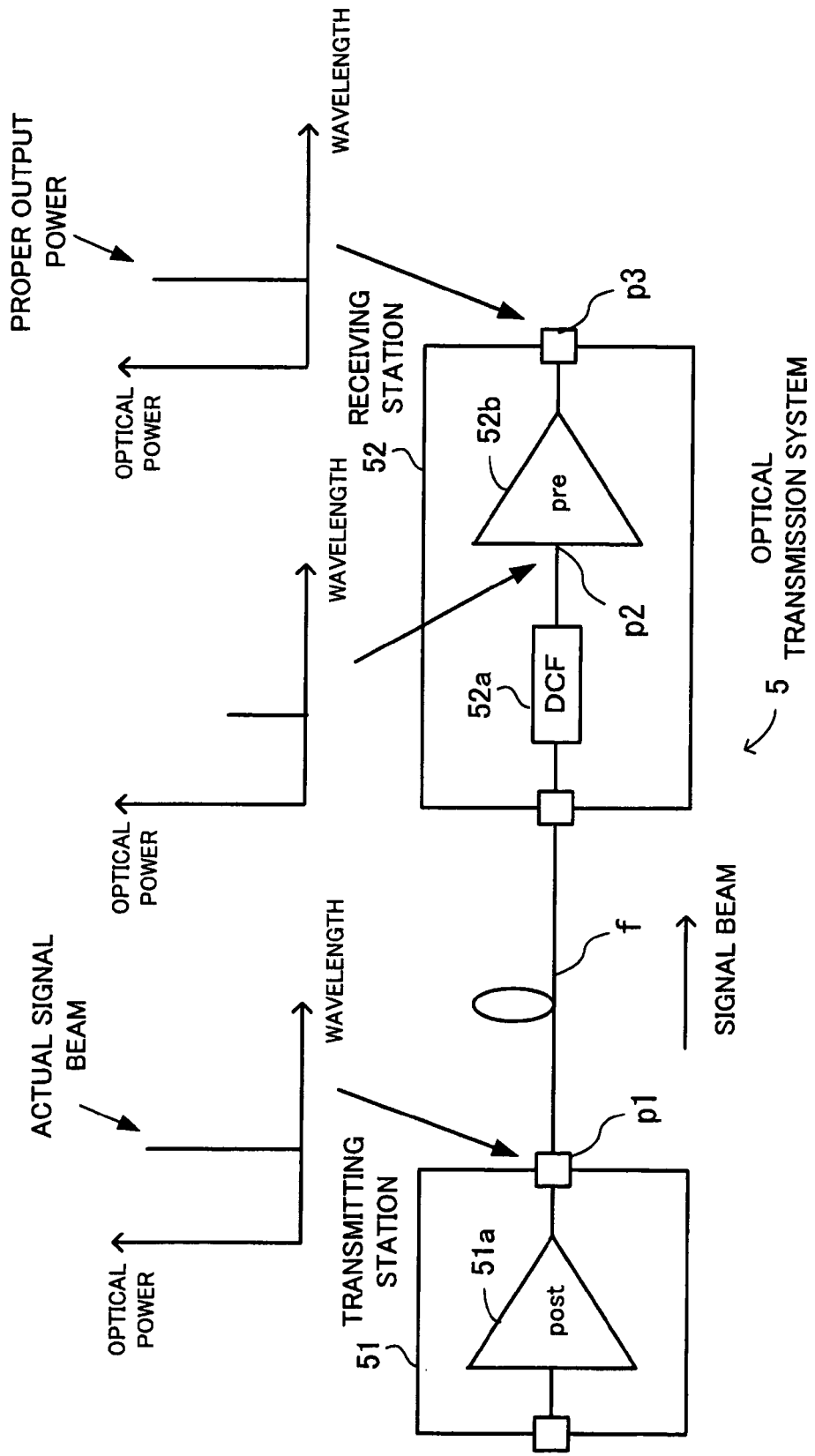
Figure 19:
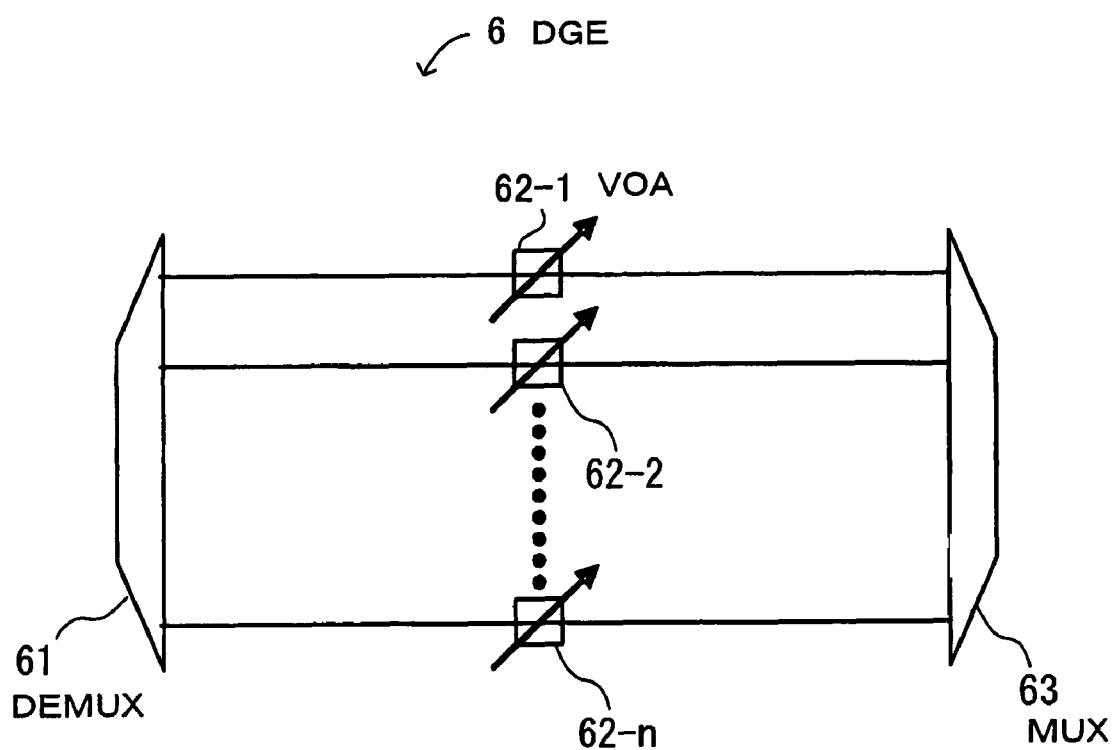
Figure 20:
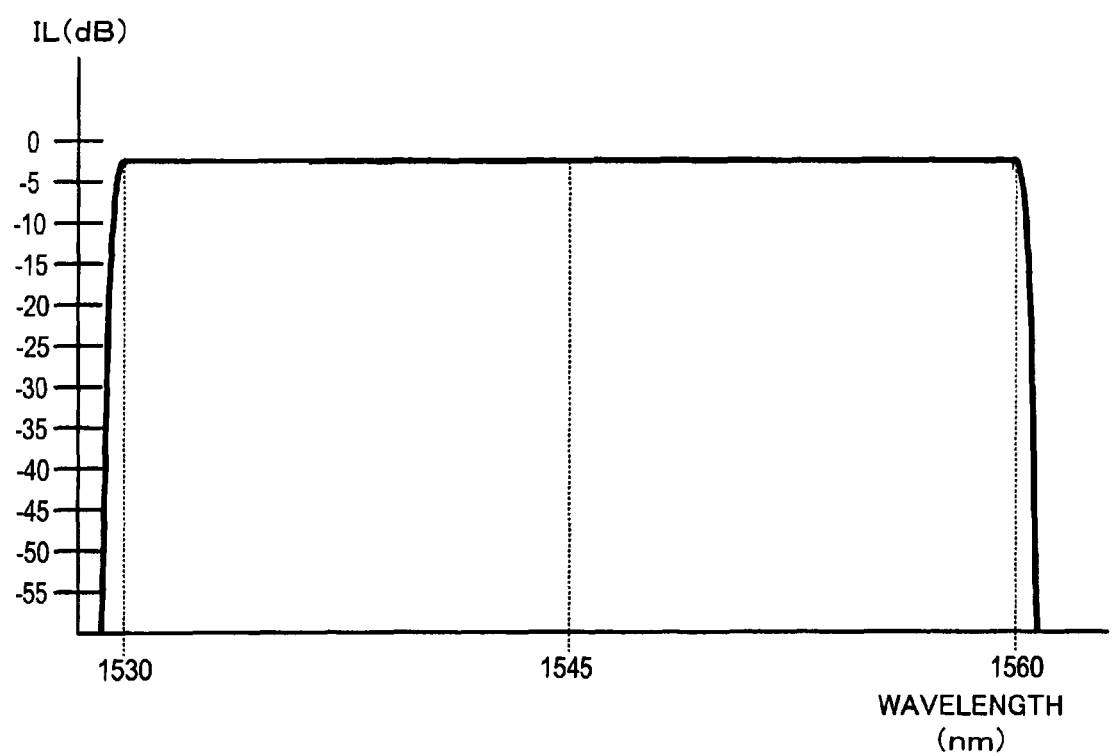
Figure 21:
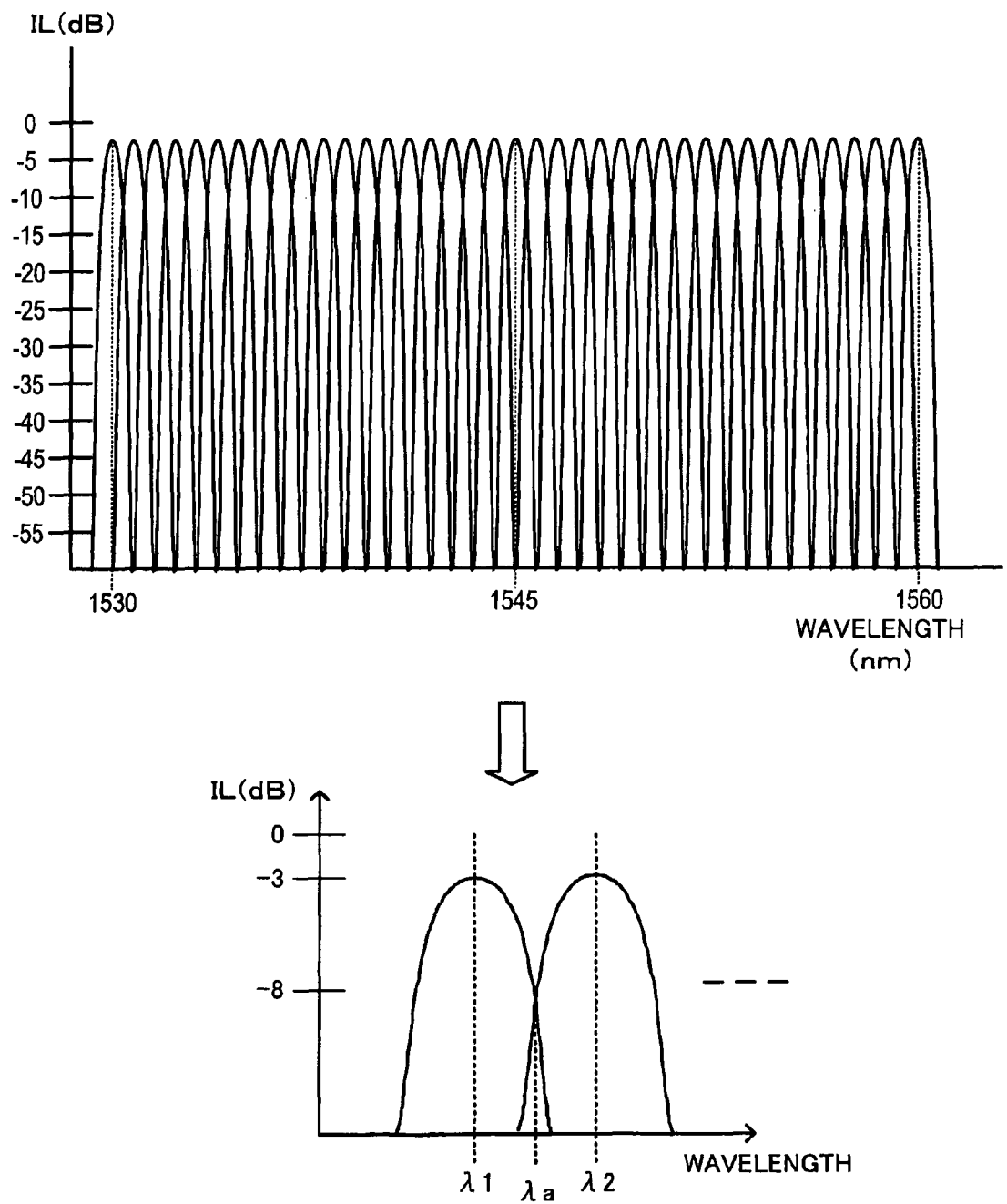
Figure 22:
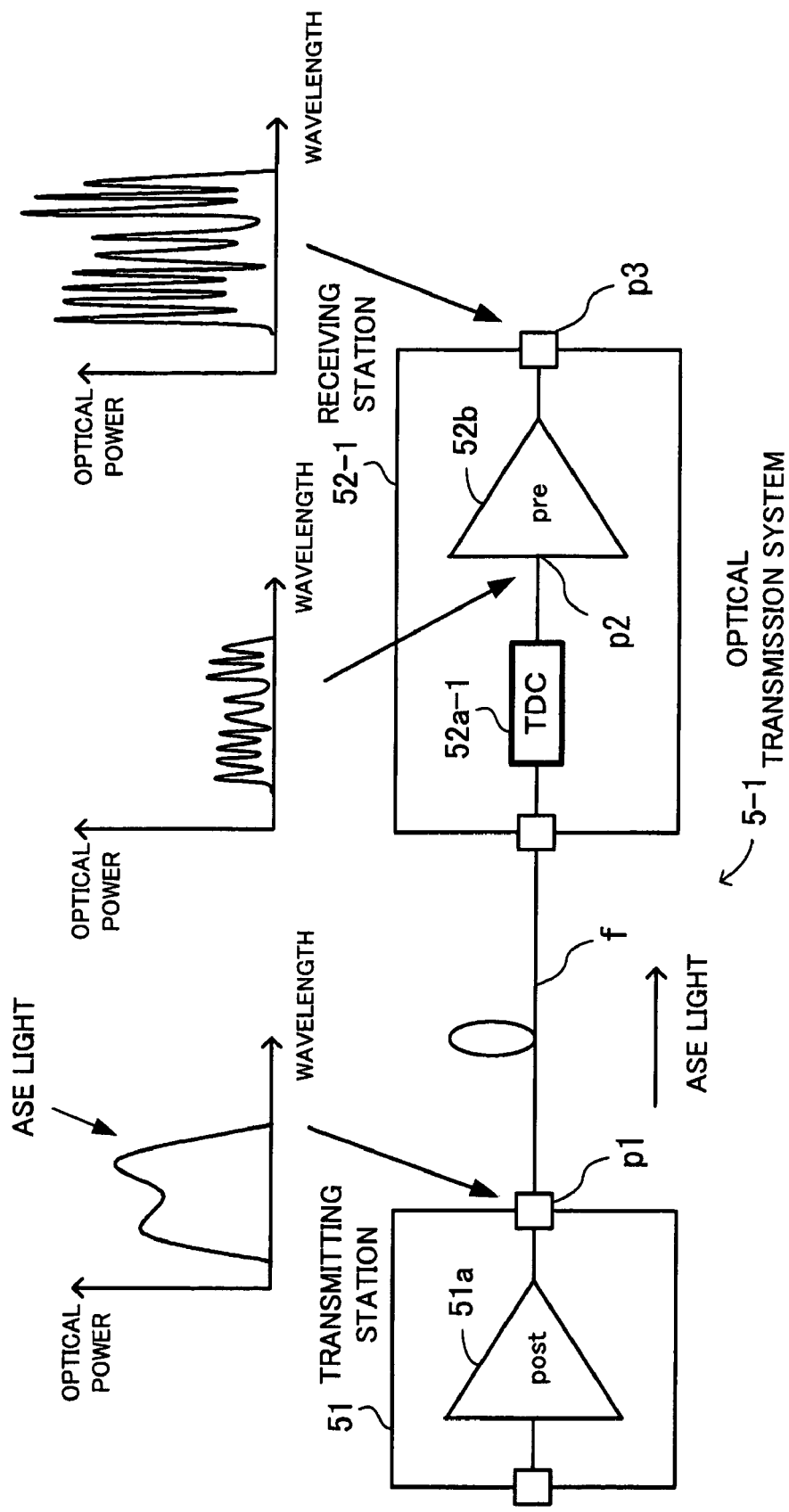
Figure 23:
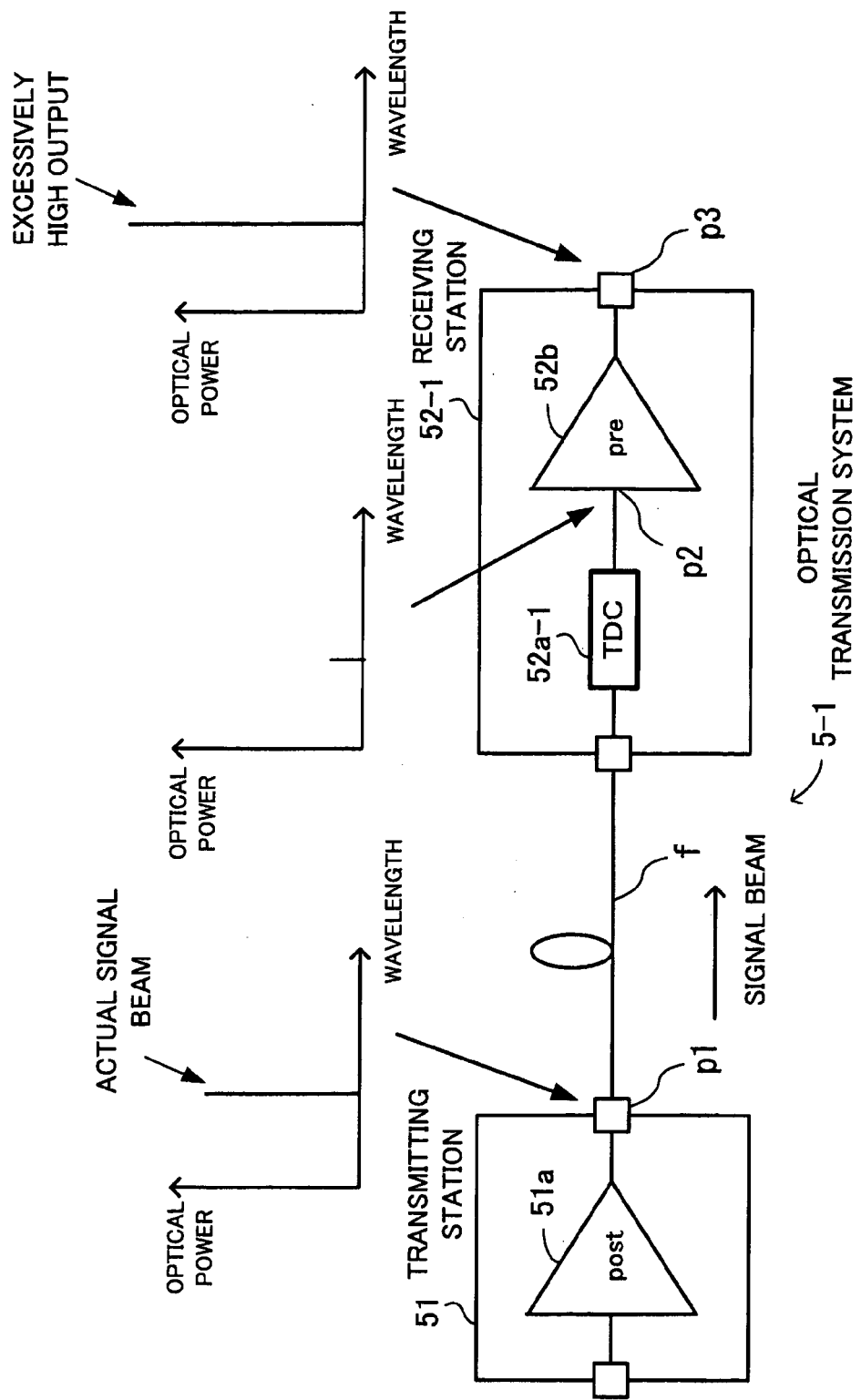

FIG. 17 schematically illustrates conventional ASE setup;

FIG. 18 illustrates power levels of a signal beam during the operation of the system after the ASE setup;

FIG. 19 illustrates the configuration of a DGE;

FIG. 20 illustrates a loss characteristic of a fixed compensation device;

FIG. 21 illustrates a loss characteristic of a variable compensation device;

FIG. 22 schematically illustrates ASE setup of a system having a variable compensation device incorporated therein; and FIG. 23 illustrates power levels of a signal beam during the operation of the system after the ASE setup.

DESCRIPTION OF EMBODIMENT(S)

Figure 1:
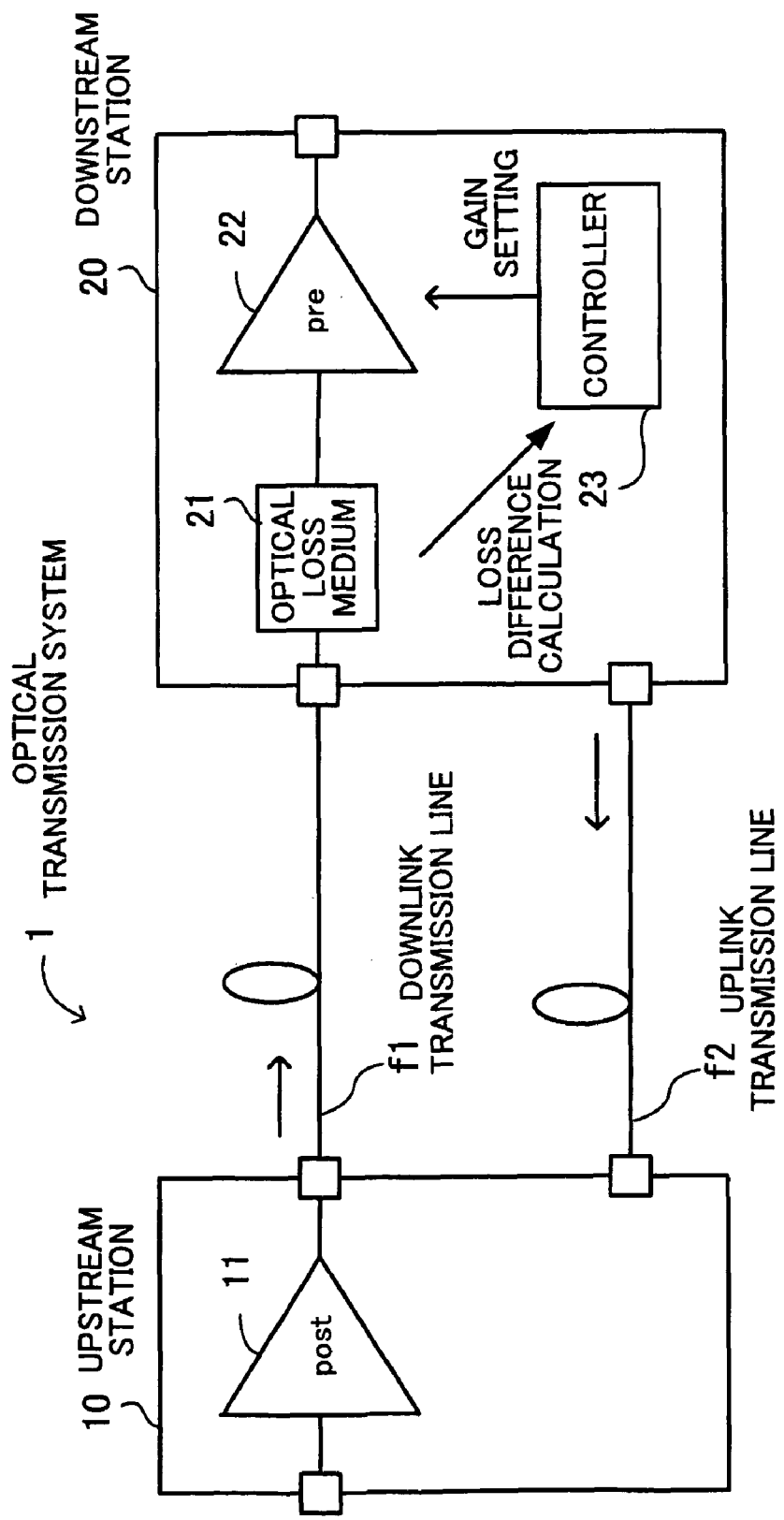
FIG. 1 illustrates the principle of an optical transmission system.

Embodiments of the present invention will be described below with reference to the accompanying drawings, wherein like reference numerals refer to like elements throughout. FIG. 1 illustrates the principle of an optical transmission system. The optical transmission system 1 comprises an upstream station 10 and a downstream station 20, which are interconnected by a downlink optical fiber transmission line f1 and an uplink optical fiber transmission line f2 to perform WDM communication.

The upstream station 10 includes an upstream-side optical amplifier (hereinafter "post-amplifier") 11 as a first optical amplifier. The downstream station 20 includes an optical loss medium 21, a downstream-side optical amplifier (hereinafter "pre-amplifier") 22 as a second optical amplifier, and a controller 23.

The post-amplifier 11 amplifies a WDM signal beam and transmits the amplified beam to the downstream station 20 through the downlink optical fiber transmission line f1. Noise light (hereinafter "ASE light") induced by spontaneous emission also leaks out from the post-amplifier 11.

The signal beam and ASE light output from the post-amplifier 11 have their level varied in accordance with information superposed on an OSC (Optical Supervisor Channel) signal, which is an optical supervisory control signal transmitted from the downstream side.

The optical loss medium 21 corresponds to a variable compensation device whose loss characteristic is not uniform in the direction of wavelength, as illustrated in FIG. 21. Specifically, the optical loss medium 21 is a TDC (Tunable Dispersion Compensator), a DGE (Dynamic Gain Equalizer), or the like. The following description is based for the most part on the assumption that the optical loss medium 21 is constituted by a TDC 21. The pre-amplifier 22 amplifies the received light and outputs the amplified light. The controller 23 determines the gain of the pre-amplifier 22 when setting up the pre-amplifier 22.

Specifically, the controller 23 acquires an ASE light loss value, which indicates a loss that the ASE light output from the post-amplifier 11 undergoes during the propagation to the pre-amplifier 22 through the TDC 21. Also, the controller 23 acquires a signal beam loss value, which indicates a loss that the signal beam output from the post-amplifier 11 undergoes during the propagation to the pre-amplifier 22 through the TDC 21. The controller 23 then obtains, as a loss difference, the difference between the ASE light loss value and the signal beam loss value and, when setting up the pre-amplifier 22, determines the gain of the pre-amplifier 22 by compensating the loss difference.

When the gain is to be determined by compensating the loss difference, the upstream station 10 is notified of the loss difference. In this case, the controller 23 first superposes the obtained loss difference on the OSC signal and then transmits the resulting signal through the uplink optical fiber transmission line f2 to notify the upstream station 10 of the loss difference.

At the upstream station 10, the notified loss difference is set in the post-amplifier 11. When the pre-amplifier 22 of the downstream station 20 is to be set up, the post-amplifier 11 generates and outputs compensated ASE light (compensated noise light) by adding the loss difference to ASE light with power corresponding to that of a single-wavelength signal of the signal beam, and using the compensated ASE light, the controller 23 determines the gain of the pre-amplifier 22 to set up the pre-amplifier 22. This procedure will be described in detail later.

The upstream and downstream stations 10 and 20 correspond, respectively, to transmitting and receiving stations. The downstream station 20 may alternatively be a repeater station including an in-line amplifier instead of the pre-amplifier 22. Namely, also in the case of a system configuration wherein the repeater station includes the optical loss medium 21, such as a TDC or a DGE, and an in-line amplifier arranged at a stage succeeding the optical loss medium 21, the gain of the in-line amplifier in the repeater station can be appropriately set (the in-line amplifier can be set up appropriately) by carrying out the ASE setup taking account of the loss difference. The optical amplifier setup method executed in the optical transmission system 1 is hereinafter referred to also as ASE loss-compensated setup in order to distinguish it from the conventional ASE setup.

Figure 2:
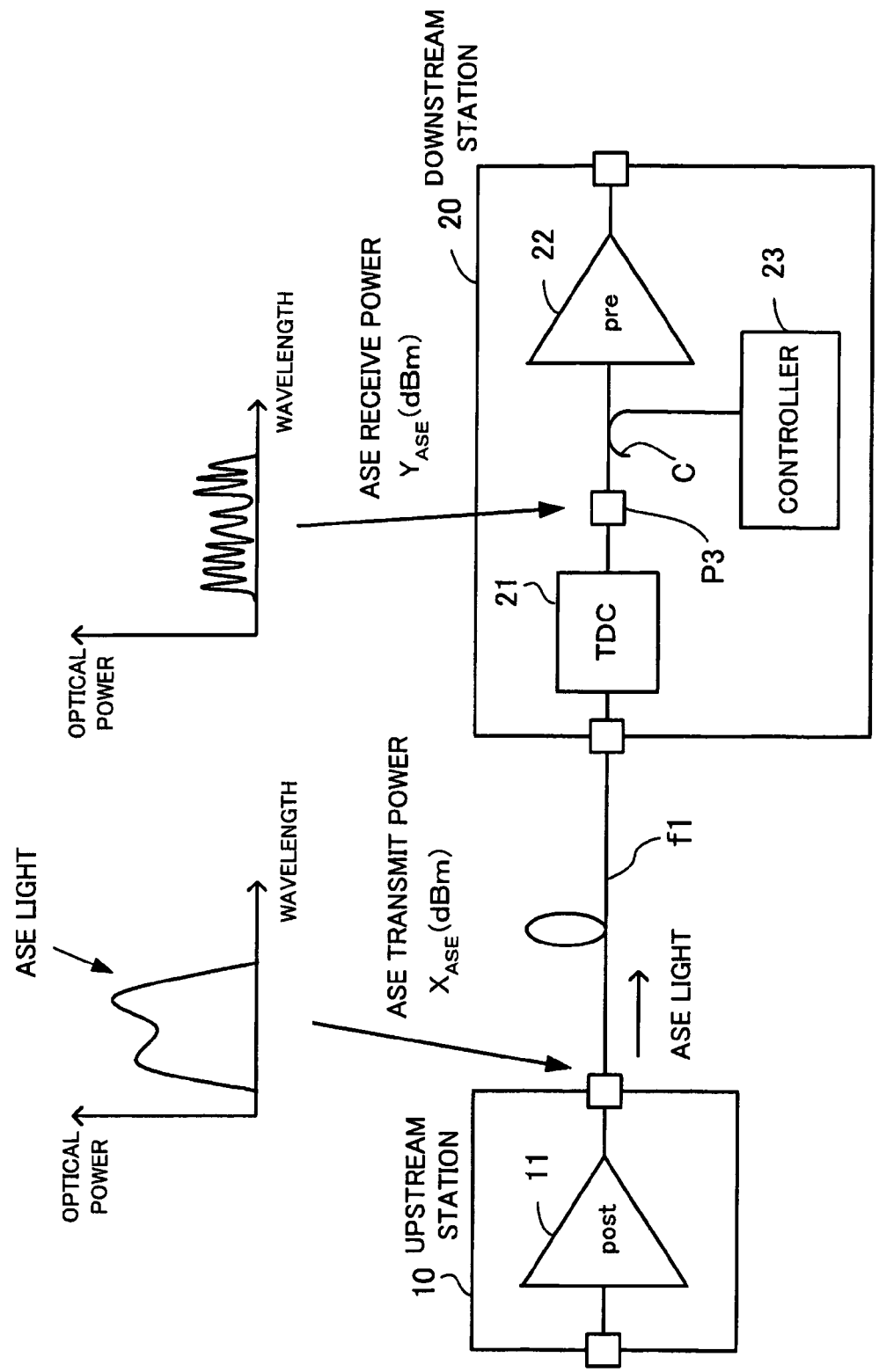
FIG. 2 illustrates the process of calculating an ASE light loss value.

The process of calculating the loss difference will be now explained. FIG. 2 illustrates the process of calculating the ASE light loss value. Provided the transmit power of the ASE light output from the post-amplifier 11 is $X_{ASE}$ (dBm) and the receive power of the ASE light arriving at point P3, which is the input end of the pre-amplifier 22, after passing through the TDC 21 is $Y_{ASE}$ (dBm), the ASE light loss value, or $Loss_{ASE}$ (dB), is given by equation (1) below.

$$Loss_{ASE} = X_{ASE} - Y_{ASE} \tag{1}$$

The controller 23 has the ASE light transmit power $X_{ASE}$ previously registered therein. A coupler C splits the light passed through the TDC 21 into two, one being output to the pre-amplifier 22 and the other to the controller 23. Using the ASE light received via the coupler C, the controller 23 actually measures the ASE light receive power $Y_{ASE}$ and, therefore, can obtain the ASE light loss value $Loss_{ASE}$ according to equation (1).

Figure 3:
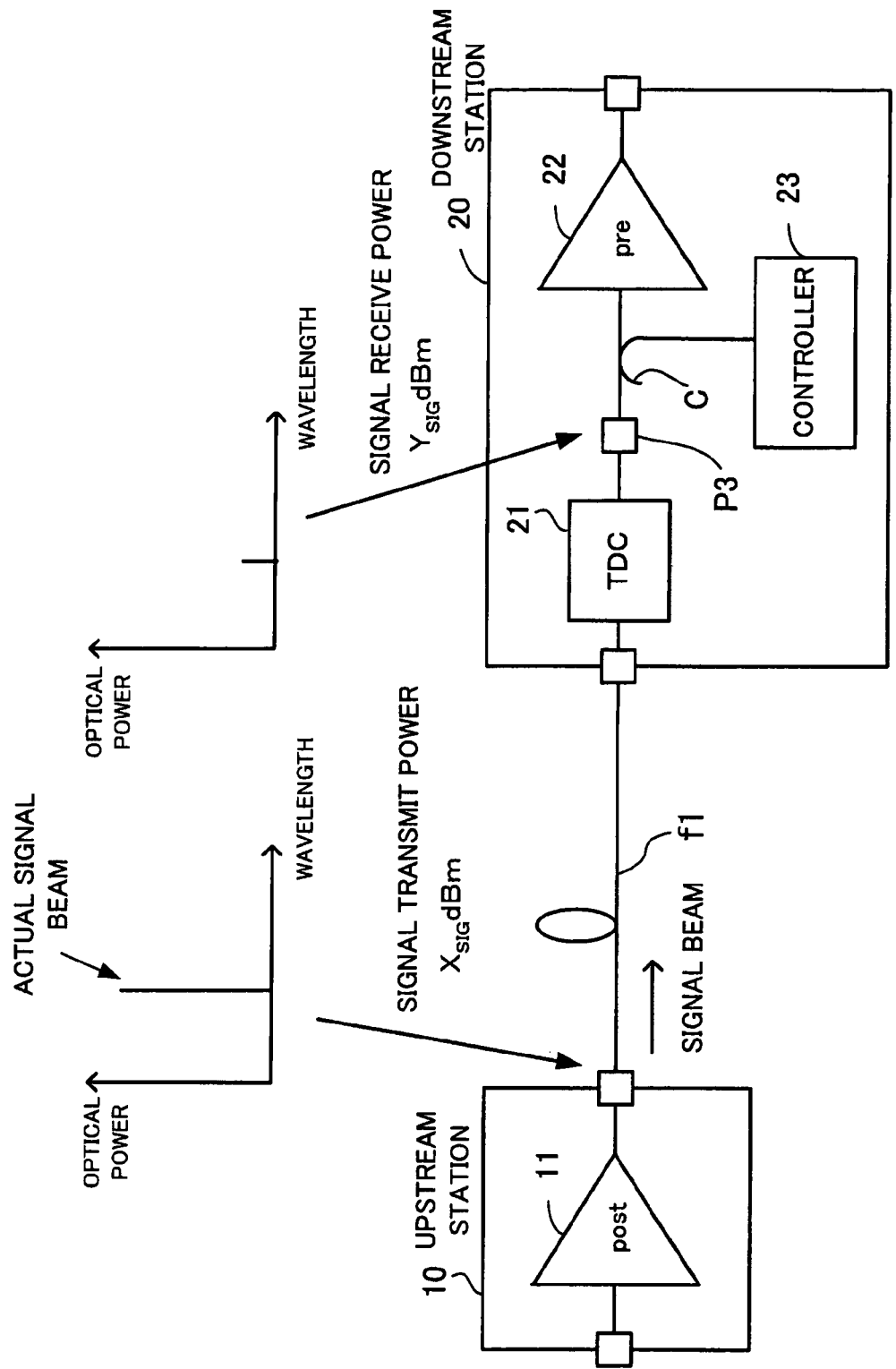
FIG. 3 illustrates the process of calculating a signal beam loss value.

FIG. 3 illustrates the process of calculating the signal beam loss value. Provided the transmit power of the signal beam output from the post-amplifier 11 is $X_{SIG}$ (dBm) and the receive power of the signal beam arriving at the point P3, which is the input end of the pre-amplifier 22, after passing through the TDC 21 is $Y_{SIG}$ (dBm), the signal beam loss value, or $Loss_{SIG}$ (dB), is given by equation (2) below.

$$Loss_{SIG} = X_{SIG} - Y_{SIG} \tag{2}$$

The controller 23 has the signal beam transmit power $X_{SIG}$ previously registered therein. Using the signal beam received via the coupler C, the controller 23 actually measures the signal beam receive power $Y_{SIG}$ and, therefore, can obtain the signal beam loss value $Loss_{SIG}$ according to equation (2).

Then, the controller 23 derives, as the loss difference, a difference between the ASE light loss value $Loss_{ASE}$, which indicates the loss that the ASE light undergoes during the transmission, and the signal beam loss value $Loss_{SIG}$, which indicates the loss that the signal beam undergoes during the transmission. The loss difference, or $Loss_{DEV}$ (dB), is given by equation (3) below.

$$Loss_{DEV} = Loss_{ASE} - Loss_{SIG} \tag{3}$$

The TDC 21 has a periodic loss characteristic that is not uniform in the wavelength direction, and accordingly, when broadband ASE light is input, the ASE light power decreases as if it were trimmed off along the periodic loss characteristic. The decrease in the power corresponds to the loss difference $Loss_{DEV}$.

In the above example, the calculations are performed using actually measured values. Where data values $Y_{ASE}$ and $Y_{SIG}$ are previously known, such loss data values may be registered in the controller 23 via a maintenance terminal or the like, without monitoring the receive power by means of the controller 23, so that the calculations may be performed.

Also, where the optical loss medium 21 is constituted by a variable compensation device that allows attenuation amounts to be set for the individual wavelengths, such as the DGE illustrated in FIG. 19, the attenuation amounts are fixed such that the losses in power in the respective wavelength regions remain equal during the measurement of the loss difference, and in this state the ASE light loss value $Loss_{ASE}$ and the signal beam loss value $Loss_{SIG}$ are acquired.

The concept of the ASE loss-compensated setup will be now explained, in comparison with the conventional ASE setup, while quoting specific numerical values. If $Y_{ASE}$ (receive power of the ASE light passed through the TDC 21), indicated in FIG. 2, and $Y_{SIG}$ (receive power of the signal beam passed through the TDC 21) are equal, the gain of the pre-amplifier 22 can be determined by the conventional ASE setup. In practice, however, $Y_{ASE}$ and $Y_{SIG}$ differ from each other ($Y_{ASE} < Y_{SIG}$), and accordingly, the ASE loss-compensated setup needs to be performed taking account of the difference between the two.

The TDC 21 has a periodic loss characteristic whose periodicity corresponds to that of wavelengths multiplexed on the WDM signal beam. Thus, where a signal beam is passed through the TDC 21, the insertion loss is small, but where broadband ASE light is passed through the TDC 21, the insertion loss is large, compared with the case of the signal beam, since the power of the ASE light is decreased because of the periodic loss characteristic. Accordingly, $Y_{ASE} < Y_{SIG}$.

Figure 4:
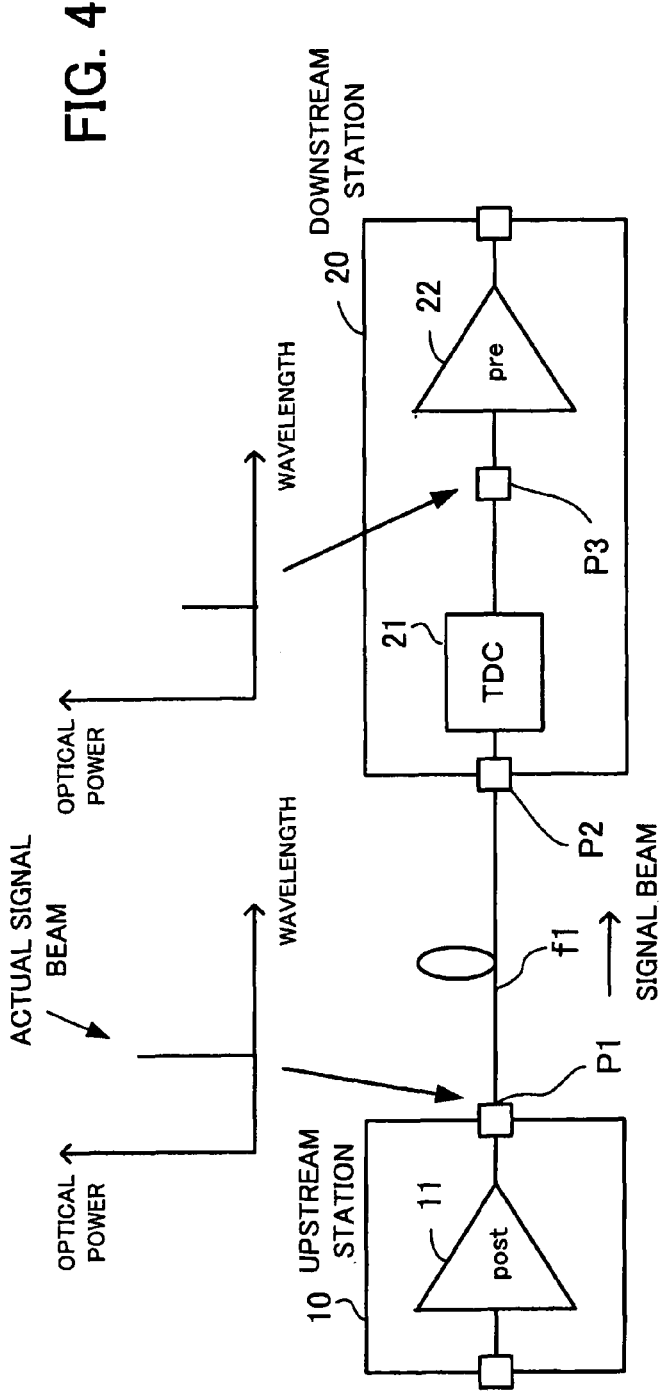
FIG. 4 illustrates power levels observed at respective points during the transmission of a signal beam.

FIG. 4 illustrates exemplary values observed at respective points during the transmission of a signal beam, or more specifically, power levels observed at respective points P1 to P3 and the gain of the pre-amplifier 22 when a single-wavelength signal beam is actually output from the post-amplifier 11. In the illustrated example, the power of the single-wavelength signal beam output from the post-amplifier 11 is assumed to be 0 dBm.

Point P1: The signal beam transmit power of the upstream station 10 is 0 dBm.

Point P2: The power of the signal beam arriving at the input end of the TDC 21 is equal to a value obtained by subtracting the transmission loss of the optical fiber transmission line f1 from the transmit power of the signal beam at the point P1. Provided the transmission loss of the optical fiber transmission line f1 is 20 dB, the power of the signal beam arriving at the input end of the TDC 21 is: 0 dBm−20 dB=−20 dBm.

Point P3: The power of the signal beam at the input end of the pre-amplifier 22 is equal to a value obtained by subtracting the loss caused during the passage of the signal beam through the TDC 21 from the signal beam power at the point P2, namely, at the input end of the TDC 21. Provided the loss in the signal beam power caused by the TDC 21 is 3 dB, the power of the signal beam at the input end of the pre-amplifier 22 is: −20 dBm−3 dB=−23 dBm.

Gain of Pre-amplifier 22: Where the target output value of the pre-amplifier 22 for a single-wavelength signal beam is 0 dBm, the pre-amplifier 22 has to amplify the input power −23 dBm up to 0 dBm, and therefore, the gain of the pre-amplifier 22 to be set is: 0 dBm−(−23 dBm)=23 dB. That is, 23 dB needs to be set as the gain of the pre-amplifier 22.

Figure 5:
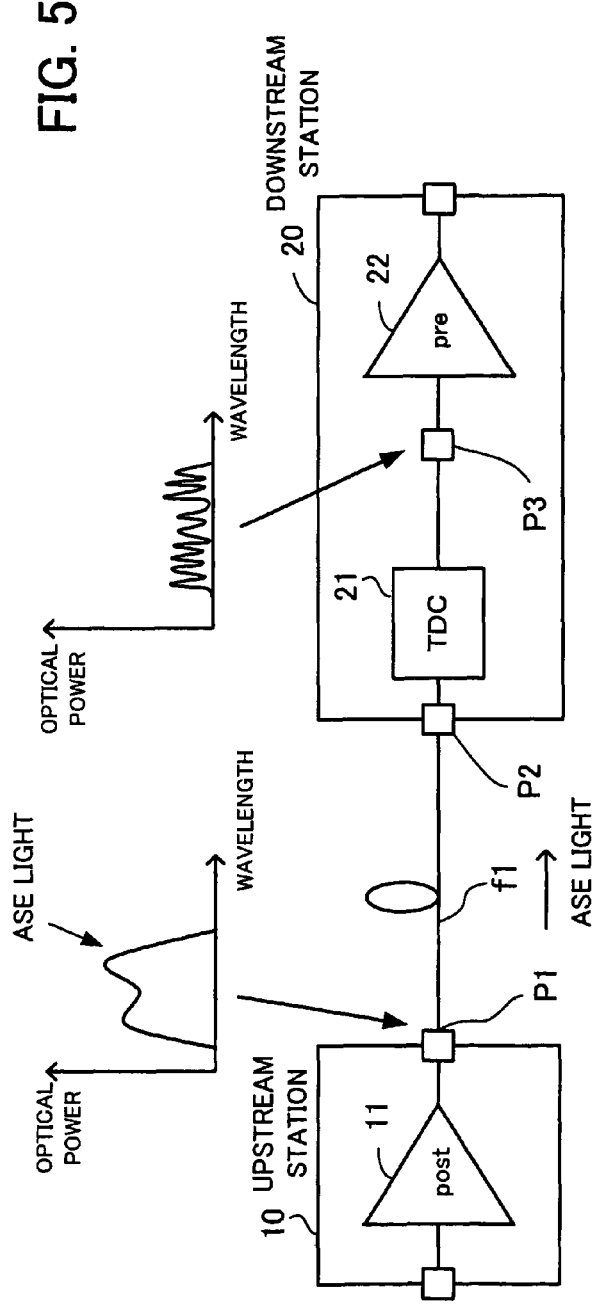
FIG. 5 illustrates power levels observed at the respective points at the time of ASE setup.

FIG. 5 illustrates exemplary values observed at the respective points during the ASE setup, or more specifically, power levels observed at the respective points P1 to P3 and the gain of the pre-amplifier 22 when ASE light is output from the post-amplifier 11 to perform the conventional ASE setup.

Point P1: The ASE light transmit power of the upstream station 10 is 0 dBm.

Point P2: The power of the ASE light arriving at the input end of the TDC 21 is equal to a value obtained by subtracting the transmission loss of the optical fiber transmission line f1 from the transmit power of the ASE light at the point P1. The transmission loss of the optical fiber transmission line f1 is 20 dB, and accordingly, the power of the ASE light arriving at the input end of the TDC 21 is: 0 dBm−20 dB=−20 dBm.

Point P3: The power of the ASE light at the input end of the pre-amplifier 22 is equal to a value obtained by subtracting the loss caused during the passage of the ASE light through the TDC 21 from the ASE light power at the point P2, namely, at the input end of the TDC 21. Provided the loss in the ASE light power caused by the TDC 21 is 6 dB, the power of the ASE light at the input end of the pre-amplifier 22 is: −20 dBm−6 dB=−26 dBm.

Calculation of Gain of Pre-amplifier 22: Where the target output value of the pre-amplifier 22 for a single-wavelength signal beam is 0 dBm, the pre-amplifier 22 has to amplify the input power −26 dBm up to 0 dBm to emit light. The gain of the pre-amplifier 22 at this time is: 0 dBm−(−26 dBm)=26 dB, and therefore, 26 dB is set as the gain of the pre-amplifier 22.

However, when the gain of the pre-amplifier 22 is set to 23 dB, normal output power is obtained from the signal beam, as explained above with reference to FIG. 4. Thus, the gain 26 dB set by the conventional ASE setup is excessively high.

Figure 6:
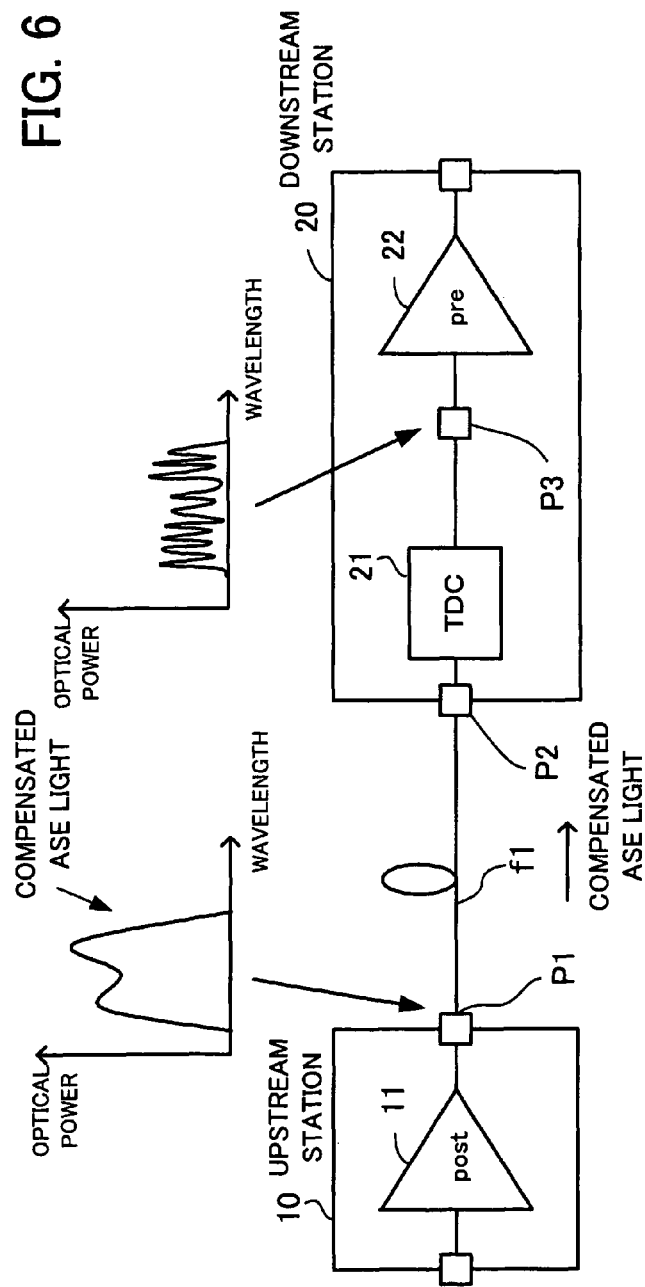
FIG. 6 illustrates power levels observed at the respective points at the time of ASE loss-compensated setup with compensated ASE light output from an upstream station.

FIG. 6 illustrates exemplary values observed at the respective points when the ASE loss-compensated setup is carried out with compensated ASE light output from the upstream station 10. More specifically, FIG. 6 illustrates power levels observed at the respective points P1 to P3 and the gain of the pre-amplifier 22 when the compensated ASE light is output from the post-amplifier 11.

The signal beam loss value $Loss_{SIG}$ is obtained by subtracting the level at the point P3 from the level at the point P1 (cf. equation (2)), as illustrated in FIG. 4, and therefore, 0 dBm−(−23 dBm)=23 dB. Also, the ASE light loss value $Loss_{ASE}$ is obtained by subtracting the level at the point P3 from the level at the point P1 (cf. equation (1)), as illustrated in FIG. 5, and therefore, 0 dBm−(−26 dBm)=26 dB. Thus, from equation (3), the loss difference $Loss_{DEV}$ is 3 dB.

Point P1: The compensated ASE light transmit power of the upstream station 10 is given by (ASE light power)+(loss difference $Loss_{DEV}$). Since the ASE light transmit power is 0 dBm (equivalent to the power of a single-wavelength signal beam) and the loss difference $Loss_{DEV}$ is 3 dB, the compensated ASE light transmit power of the upstream station 10 is: 0 dBm+3 dB=3 dBm.

Point P2: The power of the compensated ASE light arriving at the input end of the TDC 21 is equal to a value obtained by subtracting the transmission loss of the optical fiber transmission line f1 from the transmit power of the compensated ASE light at the point P1. The transmission loss of the optical fiber transmission line f1 is 20 dB, and accordingly, the power of the compensated ASE light arriving at the input end of the TDC 21 is: 3 dBm−20 dB=−17 dBm.

Point P3: The power of the compensated ASE light at the input end of the pre-amplifier 22 is equal to a value obtained by subtracting the loss caused during the passage of the compensated ASE light through the TDC 21 from the compensated ASE light power at the point P2, namely, at the input end of the TDC 21. Since the loss of the TDC 21 is 6 dB, the power of the compensated ASE light at the input end of the pre-amplifier 22 is: −17 dBm−6 dB=−23 dBm.

Calculation of Gain of Pre-amplifier 22: Where the target output value of the pre-amplifier 22 for a single-wavelength signal beam is 0 dBm, the pre-amplifier 22 has to amplify the input power −23 dBm up to 0 dBm to emit light. The gain of the pre-amplifier 22 at this time is: 0 dBm−(−23 dBm)=23 dB, and therefore, 23 dB is set as the gain after light is emitted from the pre-amplifier 22.

In this manner, the gain 23 dB, which is equal to the value indicated in FIG. 4, can eventually be set by the ASE loss-compensated setup. Thus, during the operation of the system, the signal beam can be amplified to a desired output level by the pre-amplifier 22.

Generally, when determining the target output value of the pre-amplifier 22, an ASE correction amount needs to be taken into account. Where the ASE loss-compensated setup is performed, however, it is unnecessary to use the ASE correction amount notified from the upstream station 10, and the amount of the ASE light generated by the pre-amplifier 22 has only to be taken into account (the ASE correction amount will be explained later).

As described above, in cases where a pre-amplifier is set up by using broadband ASE light in the system configuration wherein a variable compensation device having a loss characteristic not uniform in the wavelength direction, such as a TDC or a DGE, is arranged at a stage preceding the pre-amplifier, it is necessary to compensate the loss of the ASE light power caused by the variable compensation device.

Accordingly, the loss difference between the ASE light loss value, which indicates the loss that the ASE light undergoes during the propagation to the pre-amplifier through the variable compensation device, and the signal beam loss value, which indicates the loss that the signal beam undergoes during the propagation to the pre-amplifier through the variable compensation device, is obtained in advance (in short, the loss of the ASE light caused by the variable compensation device is derived beforehand), and the loss difference is notified to the upstream-side post-amplifier so that the pre-amplifier may be set up using the compensated ASE light whose output level is raised by the loss difference. This makes it possible to accurately determine the gain for the signal beam, whereby the output level of the pre-amplifier can be set to a desired level.

Also, in the ASE loss-compensated setup, the pre-amplifier 22 emits light when outputting the target output value, and when light is emitted, the gain is fixed at the then-set gain. Namely, the gain is set after light is actually emitted from the pre-amplifier 22, and therefore, it is possible to confirm in advance whether or not the pre-amplifier 22 normally emits light (e.g., whether or not the amplifier has developed internal disconnection).

The ASE correction will be now explained. The total output power from an optical amplifier contains not only the amplified component of the signal beam but the amplified component of the ASE light. Thus, if G0, for example, is set as the gain, taking only the signal beam component into account, to cause the optical amplifier to output signal beam power P0, the signal beam component fails in reality to rise to the predetermined output power P0, even though the gain G0 is set.

The reason is that the output power P0 of the optical amplifier also contains the amplified component of the ASE light, so that the output power of the signal beam lowers correspondingly. Accordingly, where the gain is set to G0 without taking account of the error component attributable to the ASE light, the signal beam component cannot be raised to the predetermined output power P0.

In order to amplify the signal beam to the predetermined output power, therefore, the target output value needs to be determined taking account of the amount of power that is lost because of the amplified component of the ASE light. Determining the target output value of an optical amplifier taking account of the amplified component of the ASE light is referred to as ASE correction, and the correction amount applied is referred to as ASE correction amount.

Without the ASE correction, as the light amplified by an optical amplifier is relayed and amplified, the ASE light also accumulates, so that the power of the signal beam lowers. Usually, information (i.e., ASE correction amount) indicating the proportion of the amplified component of the ASE light to the amplified light emitted from the upstream station is notified from the upstream station to a downstream station. Thus, the downstream station performs the ASE correction taking account of the notified ASE correction amount, to determine the target output value, whereby the signal beam can be amplified to the predetermined output power.

In the case of the conventional ASE setup, the aforementioned ASE correction needs to be carried out. Where the ASE loss-compensated setup is executed, on the other hand, it is not necessary to make the ASE correction taking account of the ASE correction amount notified from the upstream station.

Figure 7:
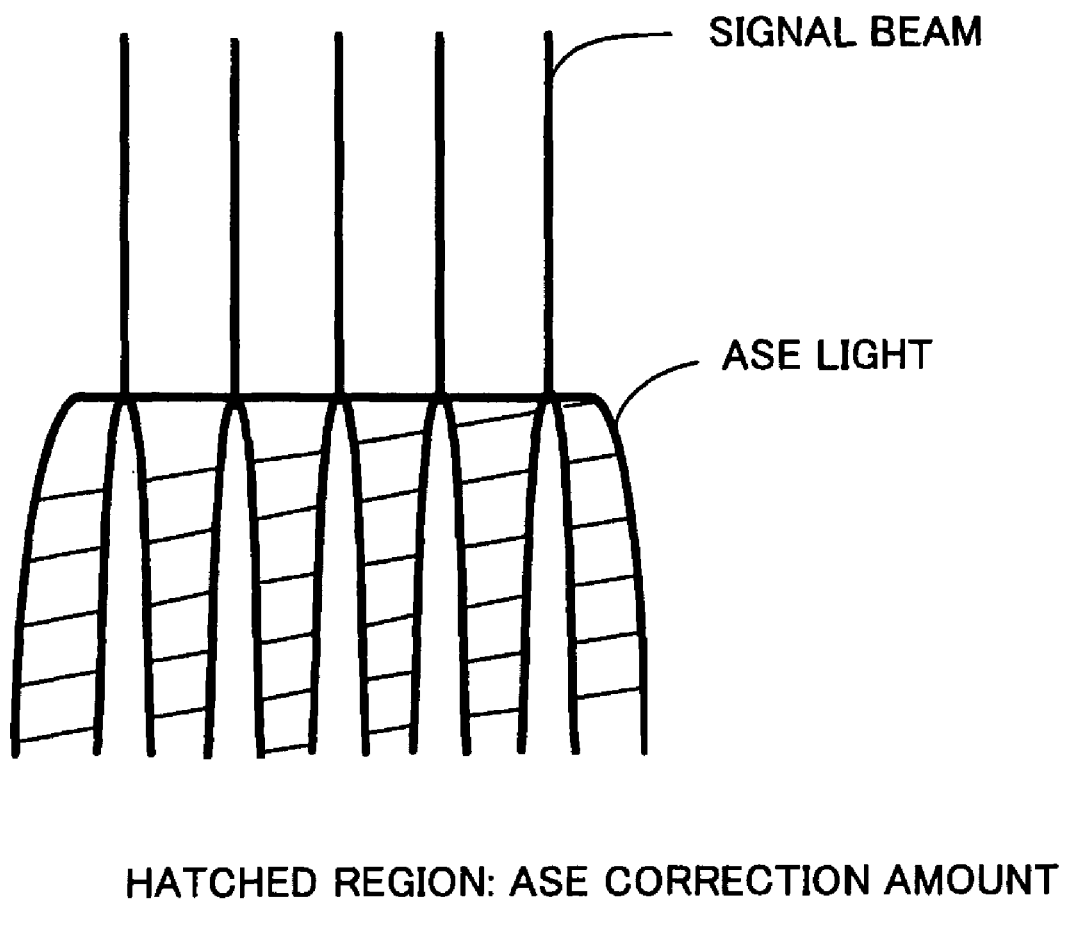
FIG. 7 illustrates the reason why the notification of an ASE correction amount from the upstream station is unnecessary.

FIG. 7 is a schematic diagram illustrating the reason why the ASE correction amount notified from the upstream station is unnecessary. The light amplified by the post-amplifier 11 contains amplified components of the signal beam and ASE light. In the ASE light illustrated, the hatched region corresponds to the ASE correction amount.

In the case of the conventional ASE setup, when the target output value of the pre-amplifier 22 is determined at the downstream station 20, a power value (a1) that allows the signal beam component to be output with predetermined output power is calculated taking account of the signal beam component alone, and the amount of power corresponding to the ASE correction amount notified from the upstream station and the amount of the ASE light generated by the pre-amplifier 22 itself are added to the power value a1. The power value obtained in this manner (=(power value a1)+(notified ASE correction amount)+(amount of ASE light generated by the pre-amplifier)) is set as the target output value, thereby enabling the pre-amplifier 22 to emit a signal beam with desired power.

On the other hand, in the case of the ASE loss-compensated setup, the hatched region of the ASE light is trimmed off by the TDC 21 in the downstream station 20. It is therefore unnecessary to perform the ASE correction using the ASE correction amount notified from the upstream station 10. The ASE correction amount notified from the upstream station 10 is not used by the controller 23 and is cleared.

During the amplification, the pre-amplifier 22 generates ASE light as state above, and the amount of the ASE light thus generated has to be taken into consideration. Specifically, the signal beam power to be amplified lowers by an amount corresponding to the amount of the ASE light generated by the pre-amplifier 22, and therefore, the target output value of the pre-amplifier 22 is determined by adding thereto the amount of the generated ASE light power (the target output level is raised by the amount of the generated ASE light power).

Figure 8:
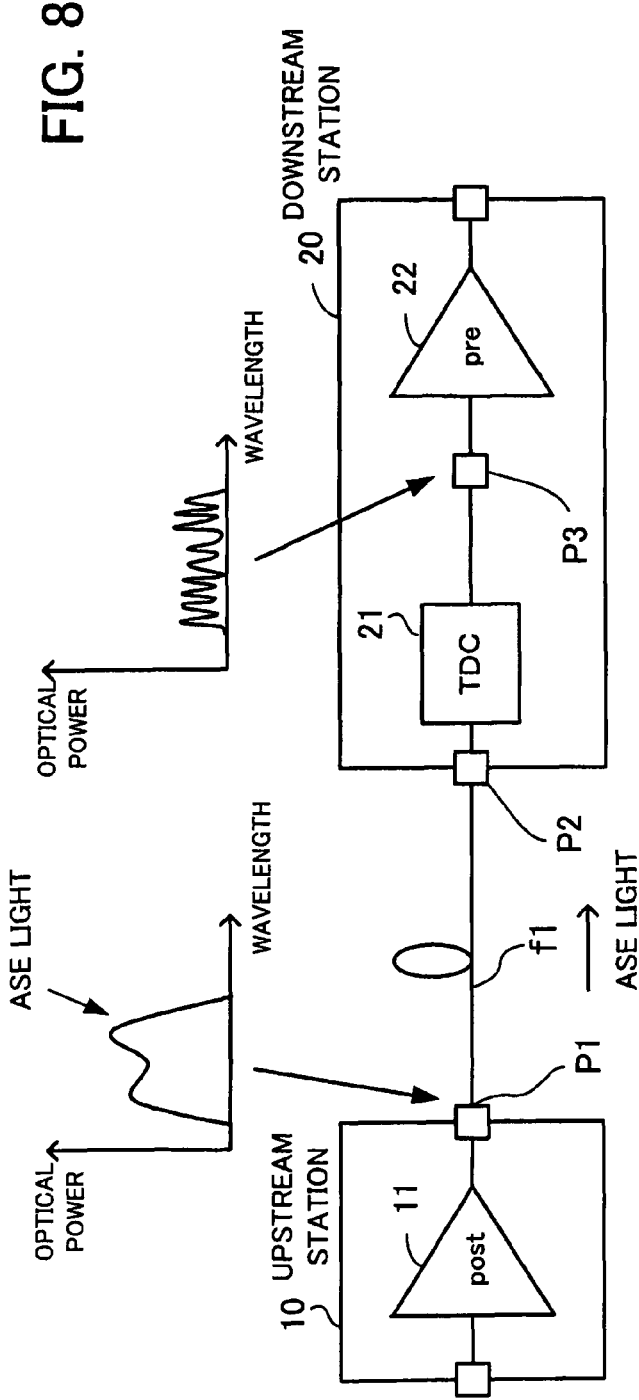
FIG. 8 illustrates power levels observed at the respective points at the time of ASE loss-compensated setup with ASE light output from the upstream station.

The following describes the case where the ASE loss-compensated setup is performed with the ASE light, not the compensated ASE light, output from the upstream station 10. FIG. 8 illustrates power levels observed at the respective points when the ASE loss-compensated setup is executed with the ASE light emitted from the upstream station 10.

Point P1: The ASE light transmit power of the upstream station 10 is 0 dBm.

Point P2: The power of the ASE light arriving at the input end of the TDC 21 is equal to a value obtained by subtracting the transmission loss of the optical fiber transmission line f1 from the transmit power of the ASE light at the point P1. Provided the transmission loss of the optical fiber transmission line f1 is 20 dB, the power of the ASE light arriving at the input end of the TDC 21 is: 0 dBm−20 dB=−20 dBm.

Point P3: The power of the ASE light at the input end of the pre-amplifier 22 is equal to a value obtained by subtracting the loss caused during the passage of the ASE light through the TDC 21 from the ASE light power at the point P2, namely, at the input end of the TDC 21. Provided the loss in the ASE light power caused by the TDC 21 is 6 dB, the power of the ASE light at the input end of the pre-amplifier 22 is: −20 dBm−6 dB=−26 dBm.

Calculation of Signal Beam Input Level: The loss difference calculated beforehand is added to the power of the ASE light at the input end of the pre-amplifier 22, to obtain the input level of a single-wavelength signal beam. Provided the loss difference $Loss_{DEV}$ is 3 dB, the input level of a single-wavelength signal beam is: −26 dBm+3 dB=−23 dB.

Calculation of Gain of Pre-amplifier 22: The gain of the pre-amplifier 22 is determined from the calculated input level of a single-wavelength signal beam and the target output value of the pre-amplifier 22. Provided the target output value for a single-wavelength signal beam is 0 dBm, the gain of the pre-amplifier 22 to be set is: 0 dBm−(−23 dBm)=23 dB, and the obtained value is set as the gain of the pre-amplifier 22.

Main differences between the ASE loss-compensated setup (k1) explained with reference to FIG. 6 and the ASE loss-compensated setup (k2) explained with reference to FIG. 8 are as follows: In the ASE loss-compensated setup k1, the upstream station 10 is notified of the loss difference, whereupon the upstream station 10 emits compensated ASE light. The pre-amplifier 22 is caused to emit light by using the compensated ASE light, and when light is emitted, the then gain is set as the gain of the pre-amplifier 22.

In the ASE loss-compensated setup k2, on the other hand, ordinary ASE light is emitted from the upstream station 10, the gain of the pre-amplifier 22 for an input signal beam is calculated from the receive power of the ASE light and the loss difference, and the calculated gain is set as the gain of the pre-amplifier 22 without causing the pre-amplifier 22 to emit light.

Also, in the ASE loss-compensated setup k1, the pre-amplifier 22 is made to emit light at the target output value, and after the light is emitted, the gain of the pre-amplifier 22 is set. Accordingly, the output light emitted from the pre-amplifier 22 can be used for setting up a downstream-side optical amplifier.

On the other hand, in the ASE loss-compensated setup k2, the gain for a signal beam is calculated without causing the pre-amplifier 22 to emit light. Thus, if the pre-amplifier 22 is made to emit light at the current input level of the ASE light with the gain set to the calculated gain, then it means that the pre-amplifier 22 emits light at a lower level than the target output value (the calculated gain is for the signal beam, and not for the ASE light). The ASE light amplified by the pre-amplifier 22 cannot therefore be used for setting up a downstream-side optical amplifier. Namely, the ASE loss-compensated setup k2 is not used in cases where the optical amplifier in a station located downstream of the downstream station 20 needs to be set up.

Also in the case of the ASE loss-compensated setup k2, the ASE correction amount notified from the upstream station 10 need not be used when determining the target output value of the pre-amplifier 22, and only the amount of the ASE light generated by the pre-amplifier 22 has to be taken into account.

Figure 9:
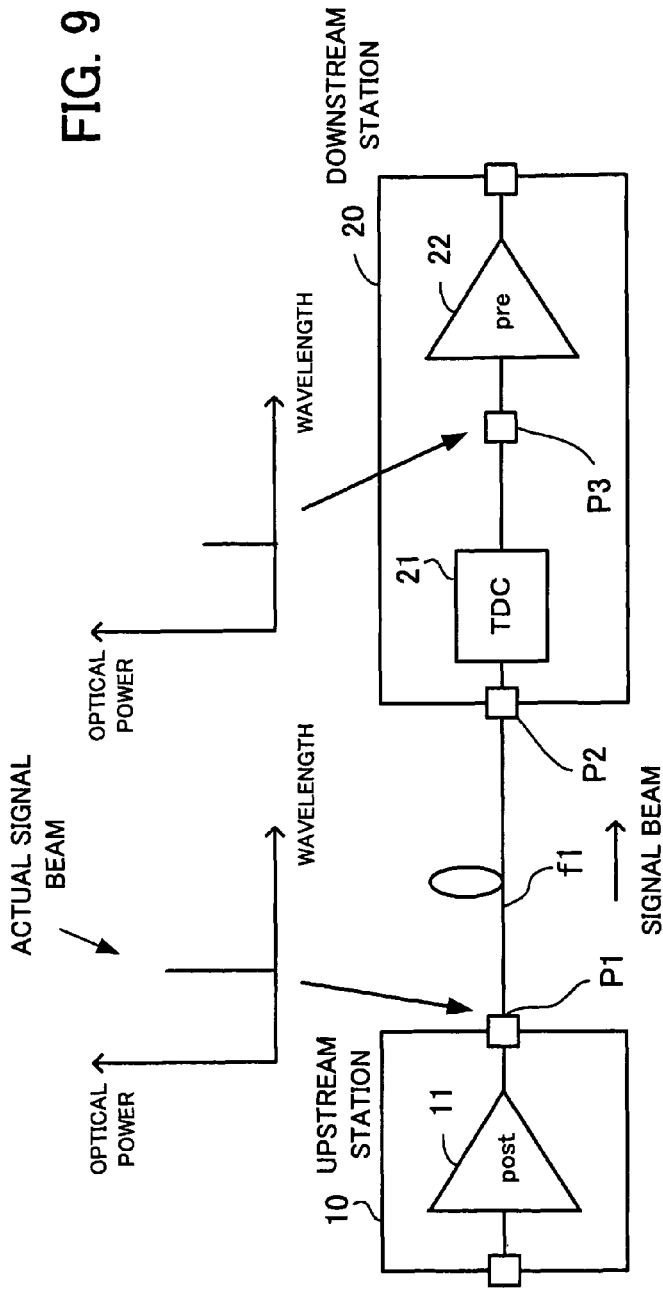
FIG. 9 illustrates power levels observed at the respective points during the transmission of the signal beam.

FIG. 9 illustrates power levels observed at the respective points during the transmission of a signal beam, or more specifically, the power levels observed at the points P1 to P3, respectively, when a single-wavelength signal beam is actually output from the post-amplifier 11 after the ASE loss-compensated setup illustrated in FIG. 8. In the illustrated example, the power of the single-wavelength signal beam output from the post-amplifier 11 is assumed to be 0 dBm.

Point P1: The signal beam transmit power of the upstream station 10 is 0 dBm.

Point P2: The power of the signal beam arriving at the input end of the TDC 21 is equal to a value obtained by subtracting the transmission loss of the optical fiber transmission line f1 from the transmit power of the signal beam at the point P1. Since the transmission loss of the optical fiber transmission line f1 is 20 dB, the power of the signal beam arriving at the input end of the TDC 21 is: 0 dBm−20 dB=−20 dBm.

Point P3: The power of the signal beam at the input end of the pre-amplifier 22 is equal to a value obtained by subtracting the loss caused during the passage of the signal beam through the TDC 21 from the signal beam power at the point P2, namely, at the input end of the TDC 21. Provided the loss in the signal beam power caused by the TDC 21 is 3 dB, the power of the signal beam at the input end of the pre-amplifier 22 is: −20 dBm−3 dB=−23 dBm.

Gain of Pre-amplifier 22: Where the target output value of the pre-amplifier 22 for a single-wavelength signal beam is 0 dBm, the pre-amplifier 22 has to amplify the input power −23 dBm up to 0 dBm, and therefore, the gain of the pre-amplifier 22 is: 0 dBm−(−23 dBm)=23 dB. Thus, the signal beam is amplified to the target output value with the same gain as that calculated by the ASE loss-compensated setup illustrated in FIG. 8.

Figure 10:
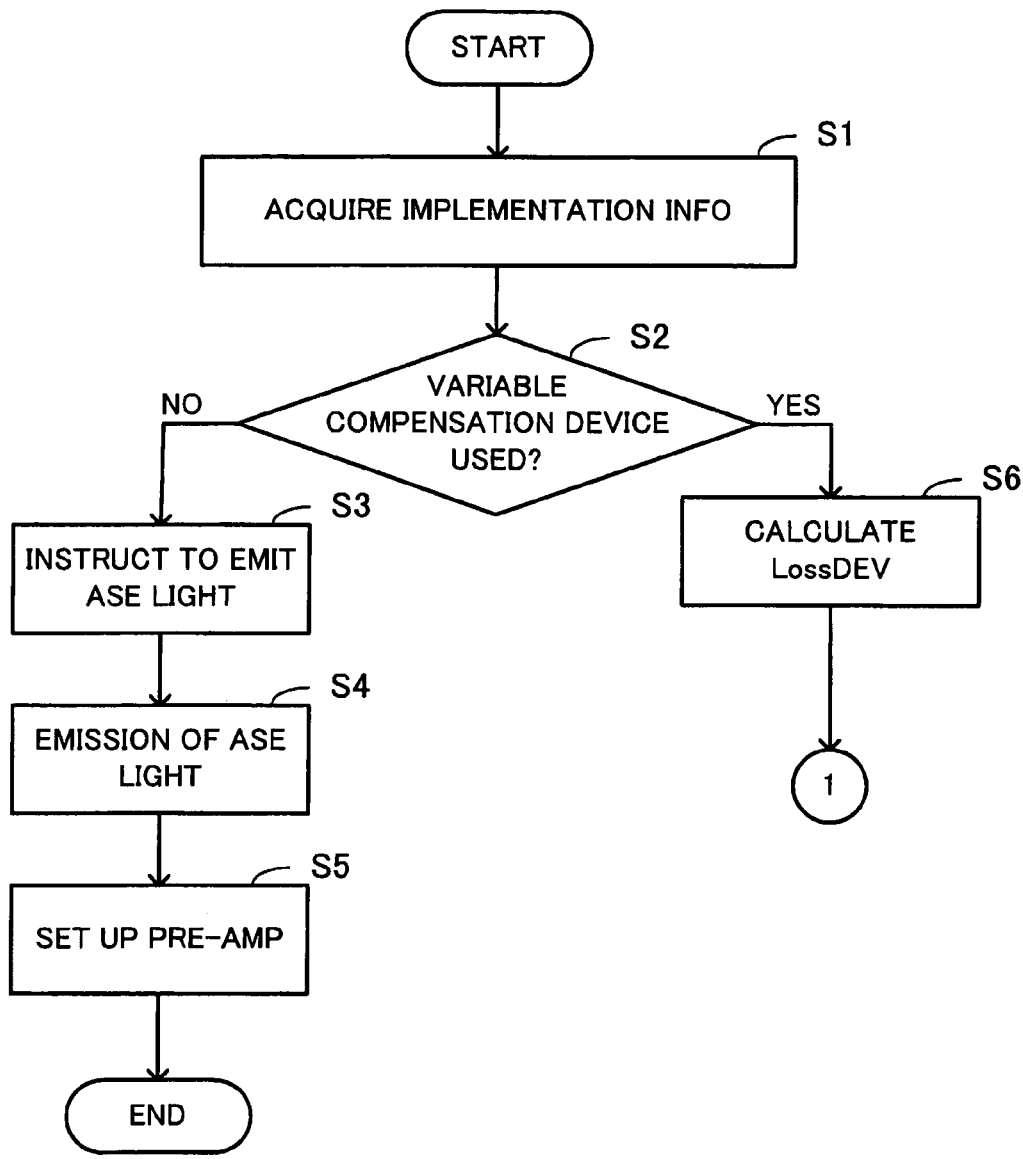
FIG. 10 is a flowchart illustrating the procedure for setting up a pre-amplifier.
Figure 11:
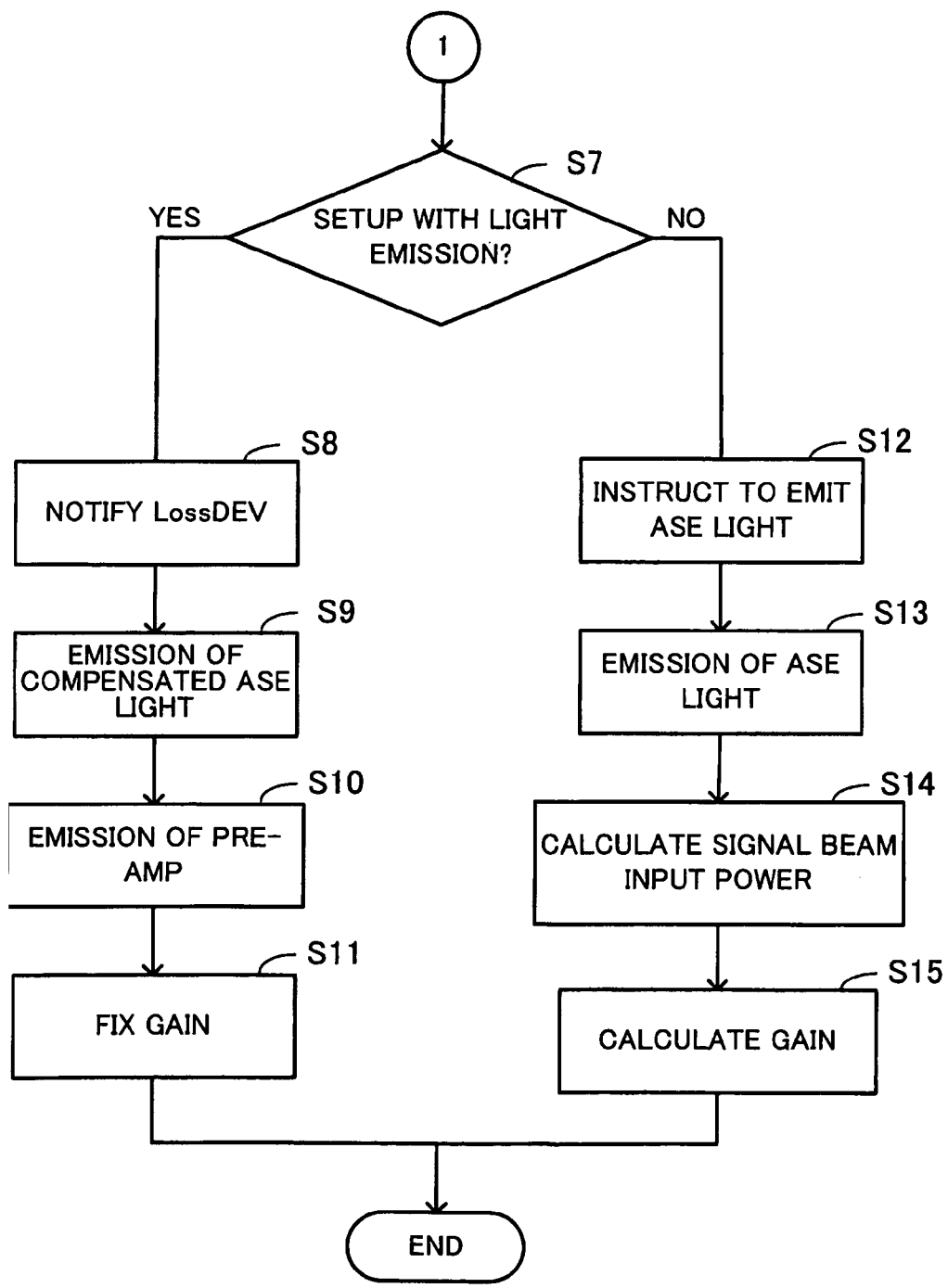
FIG. 11 is a flowchart also illustrating the procedure for setting up the pre-amplifier.

The procedure for setting up the pre-amplifier 22 will be now described with reference to the flowcharts of FIGS. 10 and 11 illustrating the pre-amplifier setup procedure.

S1: The controller 23 in the downstream station 20 acquires, from the settings in the maintenance terminal, for example, implementation information indicating whether a variable compensation device (optical loss medium 21) such as a TDC is used in the downstream station 20.

S2: If a variable compensation device having a loss characteristic not uniform in the wavelength direction is not used in the downstream station 20, the process proceeds to Step S3; if such a variable compensation device is used, the process proceeds to Step S6.

S3: Where no variable compensation device is used, the ASE setup using ordinary ASE light is performed, and therefore, using the OSC signal, the controller 23 instructs the post-amplifier 11 of the upstream station 10 to emit ASE light with power equivalent to that of a single-wavelength signal beam.

S4: The post-amplifier 11 emits ASE light with power equivalent to that of a single-wavelength signal beam.

S5: The pre-amplifier 22 receives the propagated ASE light and amplifies the input power of the ASE light up to the target level, whereupon light is emitted from the pre-amplifier 22. The controller 23 sets (fixes) the gain at the then-assumed gain, thus completing the setup of the pre-amplifier 22.

S6: Where a variable compensation device is used, the controller 23 calculates the loss difference ($Loss_{DEV}$).

S7: If the pre-amplifier 22 is to be set up with light emitted therefrom, the process proceeds to Step S8; if the pre-amplifier 22 is to be set up without emission of light, the process proceeds to Step S12.

S8: Using the OSC signal, the controller 23 notifies the upstream station 10 of the loss difference.

S9: At the upstream station 10, the loss difference is set in the post-amplifier 11. Then, the post-amplifier 11 generates compensated ASE light by adding the loss difference to the ASE light with power equivalent to that of a single-wavelength signal beam, and outputs the generated light.

S10: The pre-amplifier 22 receives the compensated ASE light and amplifies the input power of the compensated ASE light up to the target level, whereupon light is emitted from the pre-amplifier 22.

S11: The controller 23 sets (fixes) the gain of the pre-amplifier 22 at then-assumed gain, whereupon the setup of the pre-amplifier 22 is completed.

S12: using the OSC signal, the controller 23 instructs the post-amplifier 11 of the upstream station 10 to emit ASE light with power equivalent to that of a single-wavelength signal beam.

S13: The post-amplifier 11 emits ASE light with power equivalent to that of a single-wavelength signal beam.

S14: The controller 23 adds the loss difference calculated beforehand to the power of the ASE light at the input end of the pre-amplifier 22, to calculate the input level of a single-wavelength signal beam.

S15: The controller 23 determines the gain of the pre-amplifier 22 from the calculated input level of a single-wavelength signal beam and the target output value of the pre-amplifier 22.

Figure 12:
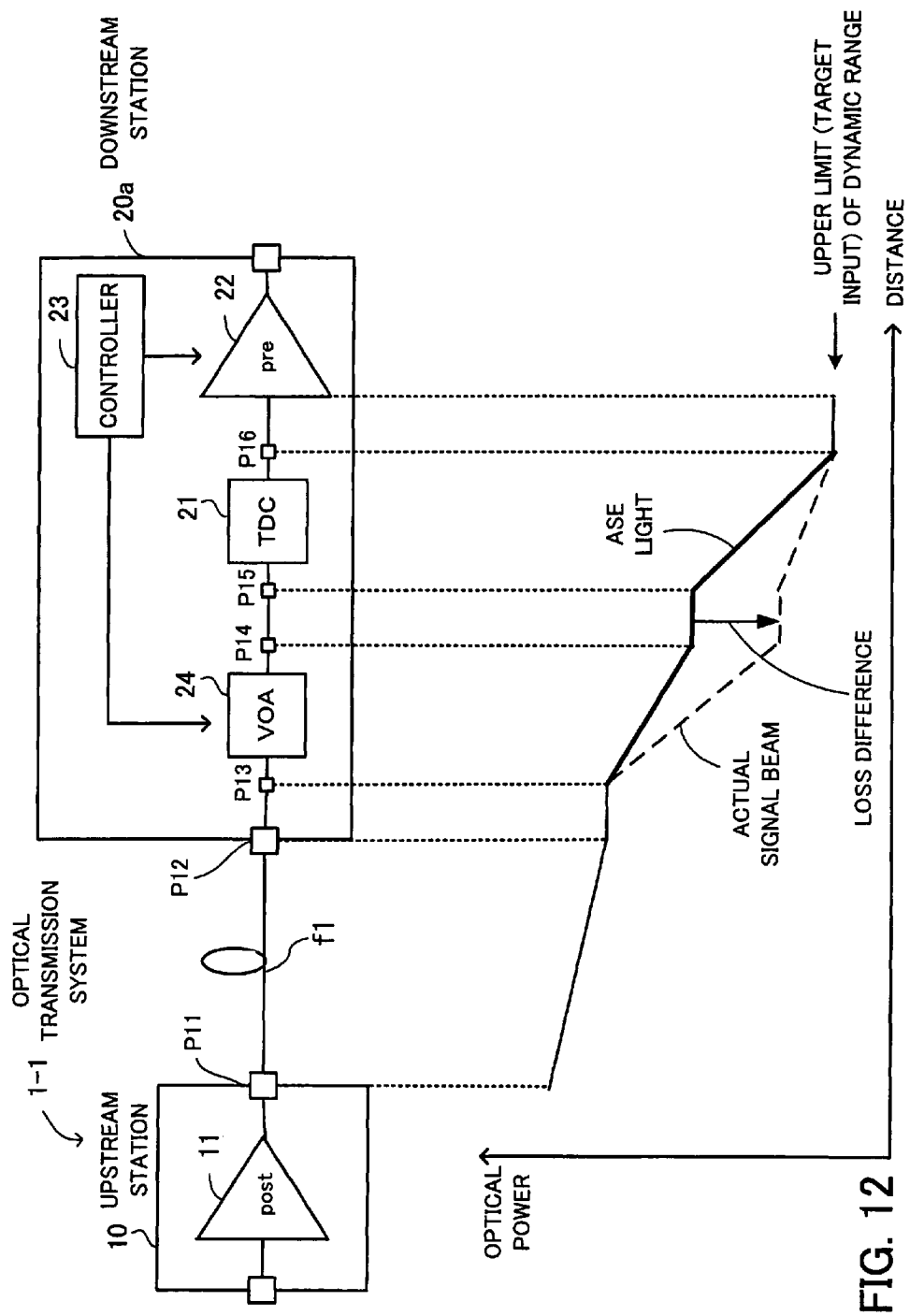
FIG. 12 illustrates an optical transmission system including a VOA, as well as a level diagram.

The following describes the case where the downstream station includes a VOA and the pre-amplifier is set up by controlling the attenuation amount of the VOA. FIG. 12 illustrates an optical transmission system including a VOA, along with a level diagram wherein the vertical axis indicates optical power and the horizontal axis indicates distance.

A downstream station 20a of the optical transmission system 1-1 includes a VOA 24 arranged at a stage preceding the TDC 21. In other respects, the system configuration is identical with that illustrated in FIG. 1. The level diagram illustrates how the optical power level varies in the individual intervals from point P11 to point P16, wherein the thick solid line indicates change in the ASE light power within the downstream station 20a and the dashed line indicates change in the signal beam power within the downstream station 20a.

When the pre-amplifier 22 is to be set up, the controller 23 controls the attenuation amount of the VOA 24 with the ASE light emitted from the post-amplifier 11 so that the input power of the ASE light input to the pre-amplifier 22 may be equal to the upper-limit value (target input value) of the input dynamic range of the pre-amplifier 22.

Decrease in the ASE light level between the points P15 and P16 represents the insertion loss of the TDC 21. Accordingly, the attenuation amount of the VOA 24 is adjusted such that the power of the ASE light which has passed through the TDC 21 having such an insertion loss becomes equal to the upper-limit value of the input dynamic range of the pre-amplifier 22. The ASE light level change between the points P13 and P14 denotes the then-adjusted attenuation level of the VOA 24.

The pre-amplifier 22 amplifies the input power of the ASE light passed through the VOA 24 whose attenuation amount has been set as aforesaid, up to the target output value to emit light. When the light is emitted from the pre-amplifier 22, the controller 23 fixes the gain of the pre-amplifier 22 at the then-assumed gain, thus setting up the pre-amplifier 22.

During the operation of the system, on the other hand, a signal beam is transmitted from the upstream station 10. If the signal beam is passed through the VOA 24 with the currently set attenuation amount left unchanged, however, the power of the signal beam at the input end of the pre-amplifier 22 exceeds the upper-limit value of the input dynamic range.

The reason is that the insertion loss caused on the signal beam by the TDC 21 is smaller than that caused on the ASE light by the TDC 21, and therefore, the attenuation amount of the VOA 24 adjusted using the ASE light to set up the pre-amplifier 22 is not suited for the signal beam. Specifically, the attenuation amount of the VOA 24 adjusted during the setup using the ASE light is smaller than an appropriate attenuation amount with which the signal beam power becomes equal to the upper-limit value of the input dynamic range (in a word, the VOA 24 adjusted during the setup using the ASE light has too wide a gap for the signal beam).

Accordingly, the attenuation amount of the VOA 24 is increased from the currently set attenuation amount by an amount corresponding to the loss difference (the VOA 24 is controlled in the direction of narrowing the gap), whereby the attenuation amount can be made suited for the signal beam. Thus, when the system is put into operation, the attenuation amount is increased by an amount corresponding to the loss difference, whereby the input power of the signal beam input to the pre-amplifier 22 can be made equal to the upper-limit value of the input dynamic range, as indicated by the dashed line.

Figure 13:
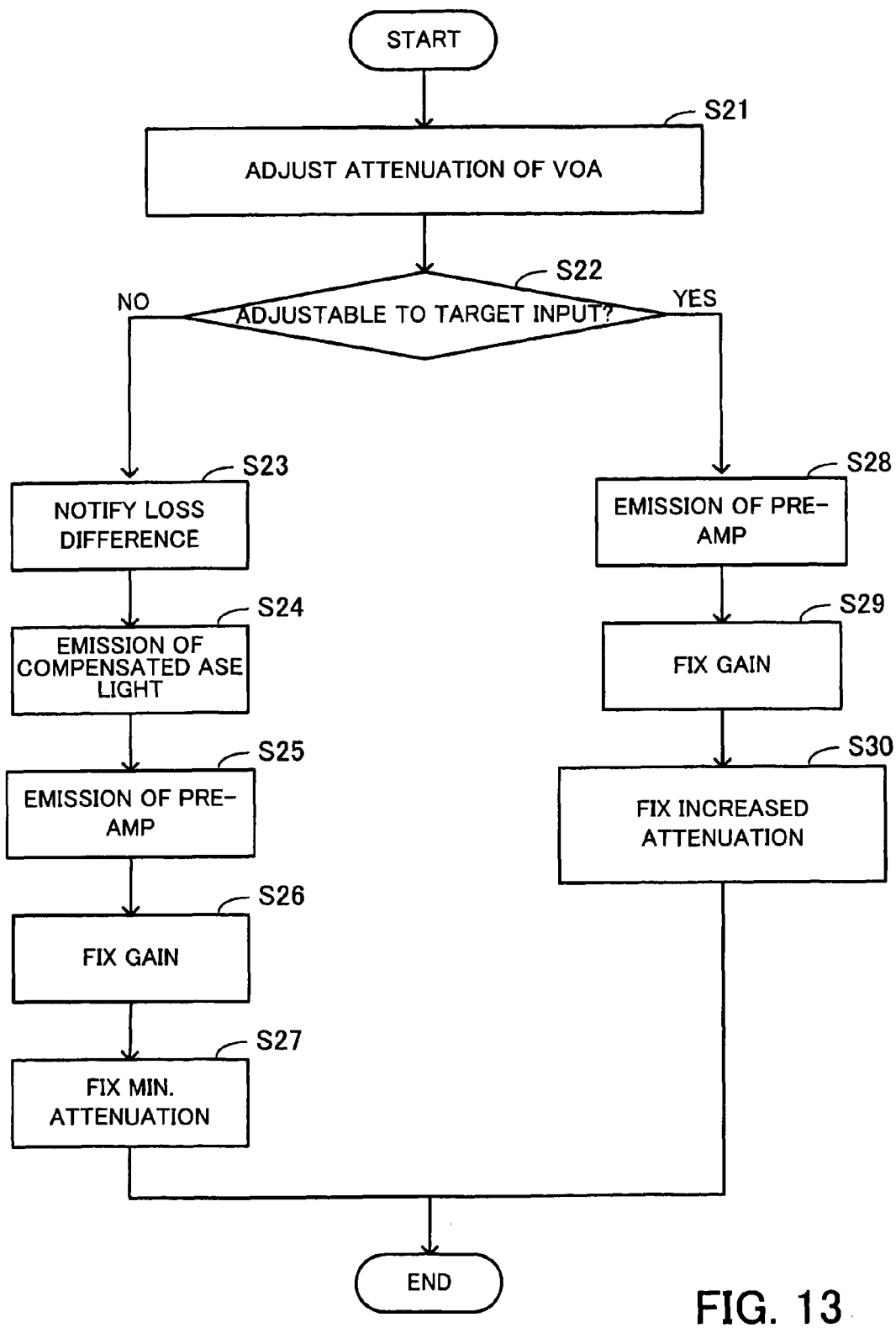
FIG. 13 is a flowchart illustrating the procedure for setting up a pre-amplifier and also setting an attenuation amount of the VOA.

The procedure for setting up the pre-amplifier 22 of the optical transmission system 1-1 and setting the attenuation amount of the VOA 24 will be now described with reference to the flowchart of FIG. 13 illustrating the pre-amplifier setup/attenuation setting procedure.

S21: With the ASE light emitted from the post-amplifier 11, the controller 23 adjusts the attenuation amount of the VOA 24 such that the power of the ASE light input to the pre-amplifier 22 becomes equal to the target input value of the pre-amplifier 22.

S22: If, during the attenuation adjustment of the VOA 24, the input power of the ASE light fails to be adjusted to the target input value even though the attenuation amount of the VOA 24 is set to a minimum attenuation amount (even though the gap of the VOA 24 is fully opened), the process proceeds to Step S23. On the other hand, if the input power of the ASE light can be adjusted to the target input value by adjusting the attenuation amount of the VOA 24 or fully opening the gap, the process proceeds to Step S28.

S23: The controller 23 notifies the upstream station 10 of the loss difference.

S24: The post-amplifier 11 generates compensated ASE light by adding the notified loss difference to the power of the ASE light and outputs the generated light.

S25: The pre-amplifier 22 amplifies the input power of the compensated ASE light up to the preset target output value, whereupon light is emitted from the pre-amplifier 22.

S26: The controller 23 fixes the gain of the pre-amplifier 22 at that gain assumed when the light is emitted from the pre-amplifier 22 because of the input of the compensated ASE light, thereby setting up the pre-amplifier 22.

S27: The controller 23 fixes the attenuation amount of the VOA 24 at the minimum attenuation amount (the VOA 24 is fixed in the fully open state).

S28: The pre-amplifier 22 amplifies the input power of the ASE light up to the preset target output value, whereupon light is emitted from the pre-amplifier 22.

S29: The controller 23 fixes the gain of the pre-amplifier 22 at that gain assumed when the light is emitted from the pre-amplifier 22 because of the input of the ASE light, thus setting up the pre-amplifier 22.

S30: When the system is put into operation, the controller 23 fixes the attenuation amount of the VOA 24 at an attenuation level increased by an amount corresponding to the loss difference (the VOA 24 is fixed in an appropriately narrowed state).

As explained above, in the system configuration including a VOA in order to expand the input dynamic range of the pre-amplifier, the attenuation amount of the VOA is adjusted, instead of controlling the output from the upstream station. Thus, even in the case where an optical loss medium having a loss characteristic not uniform in the wavelength direction is inserted in the optical fiber transmission line, the gain of the pre-amplifier can be efficiently and accurately determined to set up the pre-amplifier.

Figure 14:
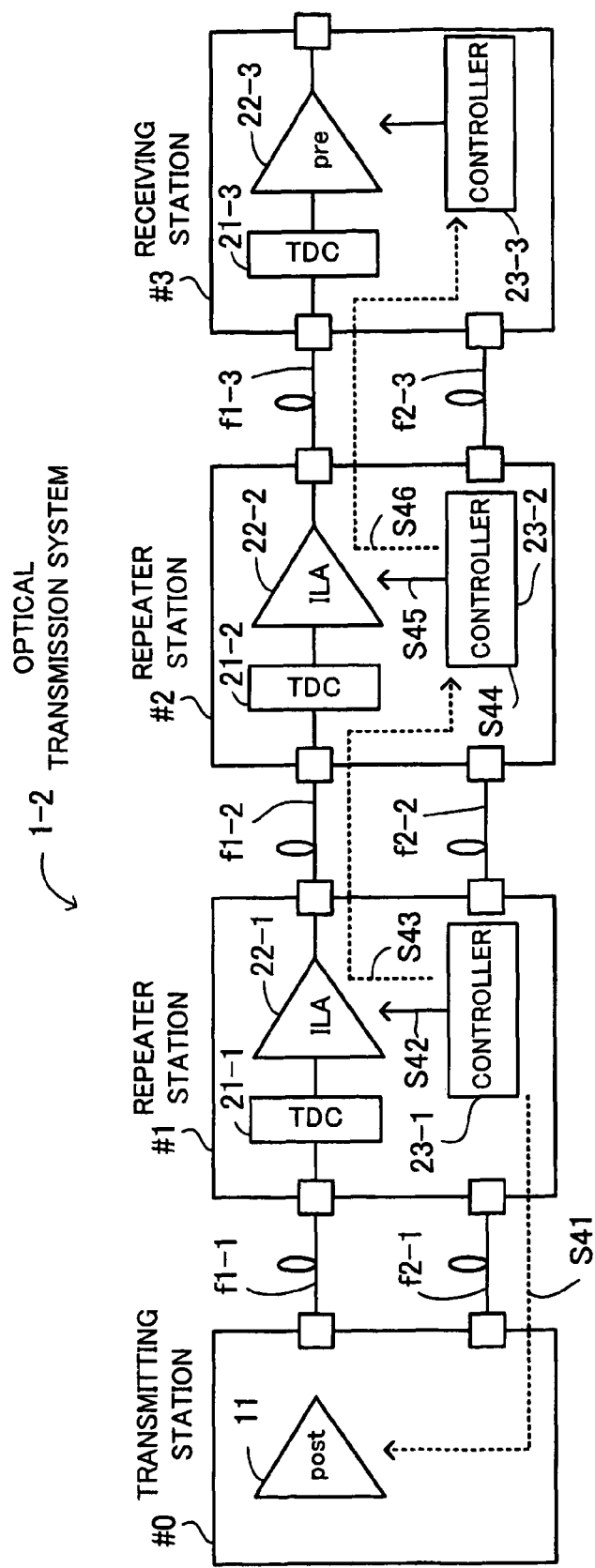
FIG. 14 illustrates an optical transmission system comprising a plurality of downstream stations.

The following describes the manner of how amplifier setup information is notified in a system including a plurality of downstream stations 20. FIG. 14 illustrates an optical transmission system including multiple downstream stations. The optical transmission system 1-2 comprises a transmitting station #0 as an upstream station, and repeater stations #1 and #2 and a receiving station #3, which are downstream stations.

The transmitting station #0 and the repeater station #1 are interconnected by downlink and uplink optical fiber transmission lines f1-1 and f2-1, the repeater stations #1 and #2 are interconnected by downlink and uplink optical fiber transmission lines f1-2 and f2-2, and the repeater station #2 and the receiving station #3 are interconnected by downlink and uplink optical fiber transmission lines f1-3 and f2-3.

The transmitting station #0 includes the post-amplifier 11. The repeater station #1 includes a TDC 21-1, an in-line amplifier 22-1 and a controller 23-1, and the repeater station #2 includes a TDC 21-2, an in-line amplifier 22-2 and a controller 23-2. The receiving station #3 includes a TDC 21-3, a pre-amplifier 22-3 and a controller 23-3.

S41: When the in-line amplifier 22-1 in the repeater station #1 is to be set up, the controller 23-1 obtains the loss difference because the TDC 21-1 is arranged at a stage preceding the in-line amplifier 22-1, and notifies the transmitting station #0 of the loss difference.

S42: During the setup, the in-line amplifier 22-1 amplifies the power of the compensated ASE light from the post-amplifier 11 up to the preset target output value, whereupon the in-line amplifier 22-1 emits light. When the light is emitted from the in-line amplifier 22-1, the controller 23-1 fixes the then-assumed gain of the in-line amplifier 22-1, thereby setting up the in-line amplifier 22-1.

S43: The controller 23-1 generates amplifier setup information indicating that the setup of the in-line amplifier 22-1 by means of the loss difference compensation has been executed. Then, the controller 23-1 superposes the amplifier setup information on the OSC signal and transmits the superposed OSC signal to the controller 23-2 in the repeater station #2 through the downlink optical fiber transmission line f1-2.

S44: The controller 23-2 in the repeater station #2 receives the OSC signal from the repeater station #1 and acquires the amplifier setup information. From the acquired information, the controller 23-2 recognizes that the loss difference compensation is not needed for setting up the in-line amplifier 22-2, though the TDC 21-2 is arranged at a stage preceding the in-line amplifier 22-2.

S45: During the setup, the in-line amplifier 22-2 amplifies the power of the light transmitted from the in-line amplifier 22-1 up to the preset target output value, so that the in-line amplifier 22-2 emits light. When the light is emitted from the in-line amplifier 22-2, the controller 23-2 fixes the then-assumed gain of the in-line amplifier 22-2, thereby setting up the in-line amplifier 22-2.

S46: The controller 23-2 passes the amplifier setup information on to the receiving station #3. At the receiving station #3, although the TDC 21-3 is arranged at a stage preceding the pre-amplifier 22-3, the ordinary setup process is executed in like manner by using the light transmitted from the in-line amplifier 22-2.

Where a variable compensation device such as a TDC is arranged in each of the repeater stations #1 and #2 and the receiving station #3, as in the aforementioned case, and the in-line amplifiers 22-1 and 22-2 and the pre-amplifier 22-3 in the respective stations are to be set up, first, the ASE loss-compensated setup (ASE loss-compensated setup k1 illustrated in FIG. 6) is executed in the repeater station #1. At this time, the in-line amplifier 22-1 of the repeater station #1 emits light from which the ASE light has been removed due to the loss characteristic of the TDC 21-1.

Thus, there exists no ASE light that is trimmed off by the downstream-side TDCs 21-2 and 21-3, and since it is ensured that the power input to the in-line amplifier 22-2 and the pre-amplifier 22-3 has a level corresponding to that of an actual single-wavelength signal beam, it is not necessary to carry out the ASE loss-compensated setup in the repeater station #2 and the receiving station #3, despite the provision of the variable compensation devices.

Accordingly, the station that executed the ASE loss-compensated setup has only to transmit, to the downstream station by means of the OSC signal, the amplifier setup information indicating that the amplifier may be ordinarily set up. As for the ASE correction, a station including a variable compensation device such as a TDC ignores the information on the ASE correction amount received from the upstream side, and simply passes the information on to the downstream side without adding the ASE correction amount. At a station not including a variable compensation device such as a TDC, the ASE correction is performed taking account of the ASE correction amount received from the upstream side.

Figure 15:
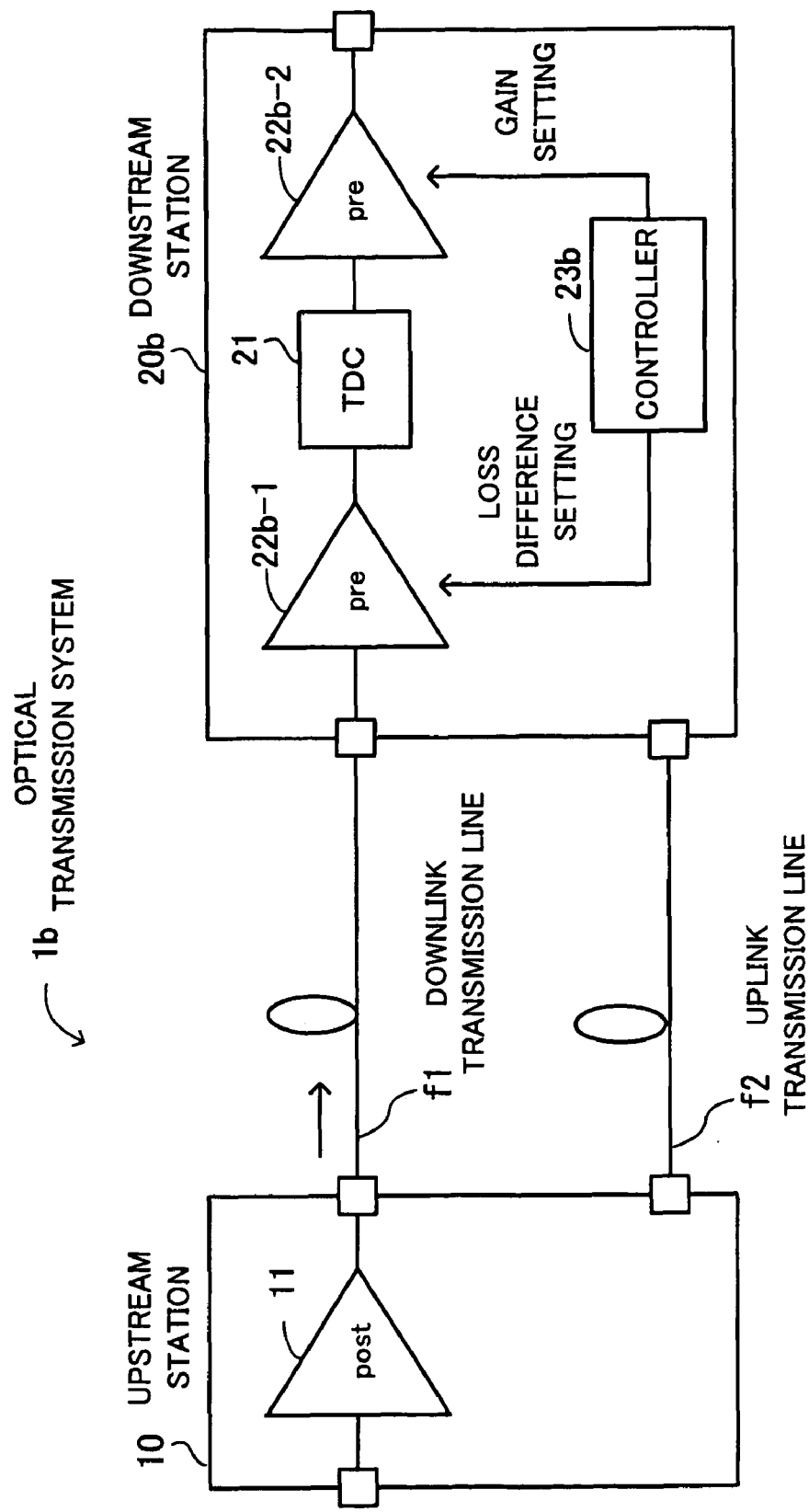
FIG. 15 illustrates a modification of the optical transmission system.

Modifications of the optical transmission system will be now described. FIG. 15 illustrates a modification of the optical transmission system, wherein a downstream station includes two pre-amplifiers and a TDC connected between the pre-amplifiers.

The optical transmission system 1b comprises the upstream station 10 and a downstream station 20b interconnected by downlink and uplink optical fiber transmission lines f1 and f2. The upstream station 10 includes the post-amplifier 11, and the downstream station 20b includes the TDC 21, pre-amplifiers 22b-1 and 22b-2, and a controller 23b. The TDC 21 is connected between the pre-amplifiers 22b-1 and 22b-2.

In the downstream station 20b configured as above, when the pre-amplifier 22b-2 is to be set up, the loss difference is not notified to the upstream station 10 but is set in the preceding-stage pre-amplifier 22b-1, whereby the ASE loss-compensated setup can be executed.

Figure 16:
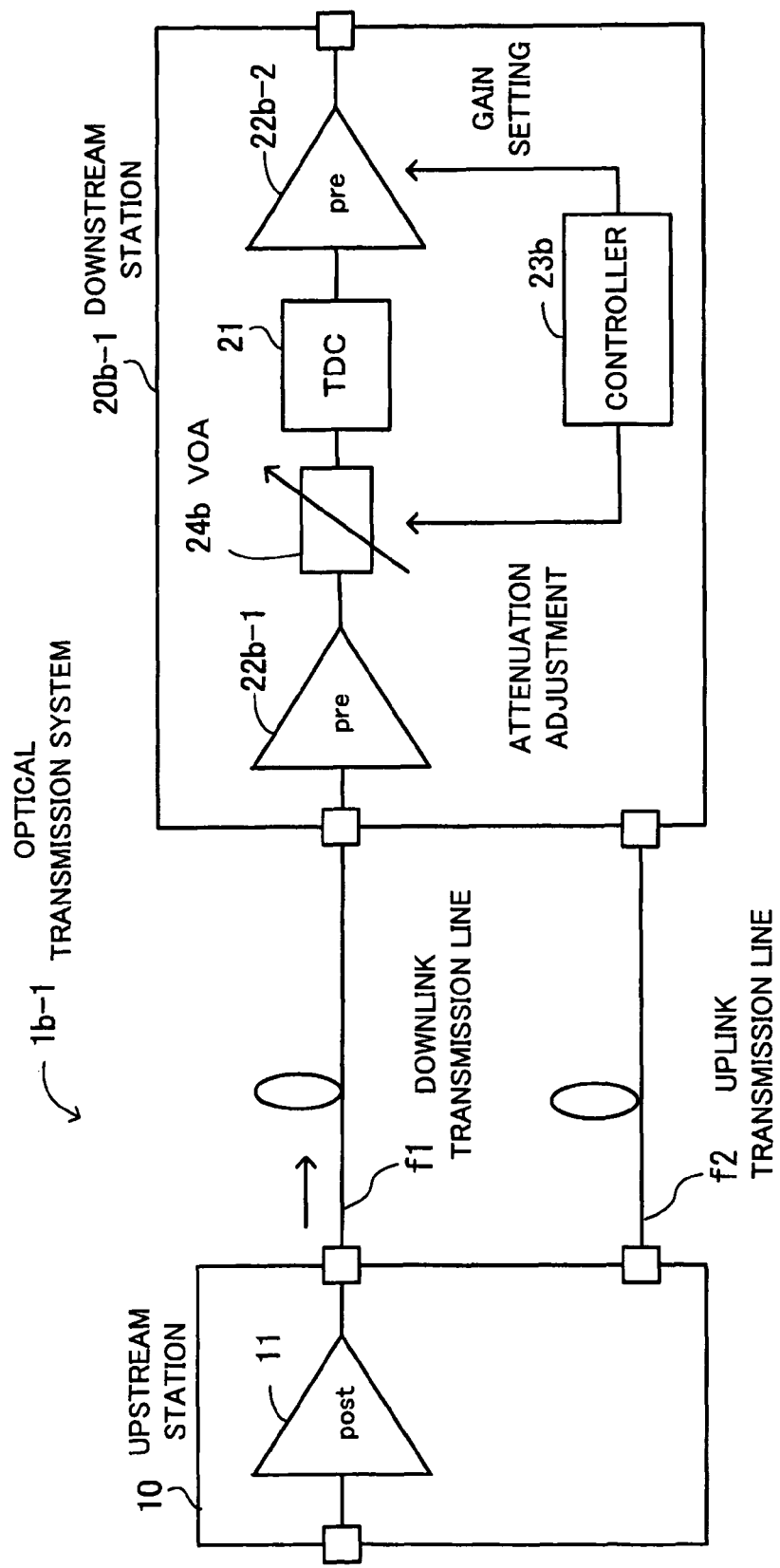
FIG. 16 illustrates another modification of the optical transmission system.

FIG. 16 illustrates another modification of the optical transmission system, wherein a downstream station includes two pre-amplifiers, and a VOA and a TDC connected between the pre-amplifiers. The optical transmission system 1b-1 comprises the upstream station 10 and a downstream station 20b-1 interconnected by downlink and uplink optical fiber transmission lines f1 and f2. The upstream station 10 includes the post-amplifier 11, and the downstream station 20b-1 includes the TDC 21, the pre-amplifiers 22b-1 and 22b-2, the controller 23b, and a VOA 24b. The VOA 24b and the TDC 21 are connected between the pre-amplifiers 22b-1 and 22b-2.

The VOA 24b is inserted in order to compensate the loss caused in the interval between the pre-amplifiers 22b-1 and 22b-2, and may be controlled in the same manner as the VOA 24 used in the system of FIG. 12 to adjust the span loss.

As explained above, when a downstream-side optical amplifier is set up using noise light, the gain to be applied to the signal beam can be accurately determined even in the case where an optical loss medium having a loss characteristic not uniform in the wavelength direction is inserted in the optical fiber transmission line. Accordingly, the downstream-side optical amplifier can be set up with accuracy, thus improving the optical transmission quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. An optical transmission system for transmitting light through an optical fiber transmission line, comprising:
    an upstream station including a first optical amplifier; and
    a downstream station including a second optical amplifier, and a controller configured to determine a gain of the second optical amplifier when setting up the second optical amplifier,
    wherein an optical loss medium having a loss characteristic not uniform in a direction of wavelength is arranged at a stage preceding the second optical amplifier, and
    the controller acquires a noise light loss value, which indicates a loss that noise light output from the first optical amplifier of the upstream station undergoes during propagation to the second optical amplifier through the optical loss medium, and a signal beam loss value, which indicates a loss that a signal beam output from the first optical amplifier undergoes during propagation to the second optical amplifier through the optical loss medium, obtains, as a loss difference, a difference between the noise light loss value and the signal beam loss value and, when setting up the second optical amplifier, determines the gain by compensating the loss difference.

2. The optical transmission system according to claim 1, wherein, where the second optical amplifier is set up after light is emitted from the second optical amplifier,
    the controller notifies the upstream station of the loss difference,
    the first optical amplifier outputs compensated noise light generated by adding the notified loss difference to power of the noise light, and
    the controller sets up the second optical amplifier by using the compensated noise light.

3. The optical transmission system according to claim 2, wherein, where the second optical amplifier of the downstream station is set up by using the compensated noise light,
    the second optical amplifier amplifies input power of the compensated noise light up to a preset target output value to emit-light, and
    the controller sets up the second optical amplifier by fixing the gain of the second optical amplifier at that gain assumed when the light is emitted from the second optical amplifier because of the input compensated noise light.

4. The optical transmission system according to claim 1, wherein the downstream station further includes a variable optical attenuator configured to variably adjust input power to the second optical amplifier, the optical loss medium being connected between the variable optical attenuator and the second optical amplifier,
    wherein, with the noise light emitted from the first optical amplifier, the controller adjusts an attenuation amount of the variable optical attenuator such that input power of the noise light input to the second optical amplifier becomes equal to a target input value of the second optical amplifier, and if the input power of the noise light fails to reach the target input value even though the attenuation amount of the variable optical attenuator is set to a minimum attenuation amount, the controller notifies the upstream station of the loss difference, the first optical amplifier outputs compensated noise light generated by adding the notified loss difference to power of the noise light, the second optical amplifier amplifies input power of the compensated noise light up to a preset target output value to emit light, the controller sets up the second optical amplifier by fixing the gain of the second optical amplifier at that gain assumed when the light is emitted from the second optical amplifier because of the input compensated noise light, and the attenuation amount of the variable optical attenuator is fixed at the minimum attenuation amount.

5. The optical transmission system according to claim 4, wherein, with the noise light emitted from the first optical amplifier, the controller adjusts the attenuation amount of the variable optical attenuator such that the input power of the noise light input to the second optical amplifier becomes equal to the target input value of the second optical amplifier, and if the input power of the noise light can be adjusted to the target input value without setting the attenuation amount of the variable optical attenuator to the minimum attenuation amount, the second optical amplifier amplifies the input power of the noise light up to the preset target output value to emit light, the controller sets up the second optical amplifier by fixing the gain of the second optical amplifier at that gain assumed when the light is emitted from the second optical amplifier because of the input noise light, and during operation of the system, the attenuation amount of the variable optical attenuator is fixed at an attenuation level increased by an amount corresponding to the loss difference.

6. The optical transmission system according to claim 1, wherein, when notified from the upstream station of a noise light correction amount indicating a proportion of an amplified component of the noise light to amplified light output from the first optical amplifier, the controller sets a target output value of the second optical amplifier based on an amount of the noise light contained in amplified light generated by the second optical amplifier, without using the noise light correction amount.

7. The optical transmission system according to claim 1, wherein the downstream station includes a plurality of downstream stations #1 to #n connected to the optical fiber transmission line, when the second optical amplifier in the downstream station #1 is set up, the controller in the downstream station #1 determines the gain of the second optical amplifier by compensating the loss difference, and also generates setup information indicating that the second optical amplifier of the downstream station #1 has been set up by compensating the loss difference, the setup information is transmitted to the downstream stations #2 to #n, on receiving the setup information, the controller in the downstream station #k ($2 \leq k \leq n$) recognizes that it is not necessary to compensate the loss difference when setting up the kth optical amplifier in the downstream station #k, and when the kth optical amplifier in the downstream station #k is set up, the kth optical amplifier in the downstream station #k amplifies light power from the downstream station #k-1 up to a preset target output value to emit light, and the controller in the downstream station #k sets up the kth optical amplifier by fixing the gain of the kth optical amplifier at that gain assumed when the light is emitted from the kth optical amplifier because of the input light.

8. The optical transmission system according to claim 1, wherein the downstream station further includes an additional optical amplifier arranged at a stage preceding the optical loss medium, and wherein the controller sets the loss difference in the additional optical amplifier, the additional optical amplifier outputs compensated noise light generated by adding the set loss difference to power of the noise light, and the controller sets up the second optical amplifier by using the compensated noise light.

9. The optical transmission system according to claim 1, wherein the downstream station further includes a variable optical attenuator arranged at a stage preceding the optical loss medium, and wherein the controller sets the loss difference in the variable optical attenuator, the variable optical attenuator outputs compensated noise light generated by adding the set loss difference to power of the noise light, and the controller sets up the second optical amplifier by using the compensated noise light.

10. An optical amplifier for transmitting a signal beam and noise light to a receiving section including an optical loss medium having a loss characteristic not uniform in a direction of wavelength and a downstream-side optical amplifier arranged at a stage succeeding the optical loss medium, wherein, when the downstream-side optical amplifier is set up, the optical amplifier outputs corrected noise light generated by adding a loss difference to the noise light, the loss difference being a difference between a noise light loss value, which indicates a loss that the noise light undergoes during propagation to the downstream-side optical amplifier through the optical loss medium, and a signal beam loss value, which indicates a loss that the signal beam undergoes during propagation to the downstream-side optical amplifier through the optical loss medium.

* * * * *